(12) United States Patent
Saeki et al.

(10) Patent No.: US 7,492,135 B2
(45) Date of Patent: Feb. 17, 2009

(54) SWITCHING CONVERTER

(75) Inventors: Mitsuo Saeki, Kawasaki (JP); Kouichi Matsuda, Kawasaki (JP); Shigeaki Nakazawa, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 11/377,213

(22) Filed: Mar. 17, 2006

(65) Prior Publication Data

US 2006/0208715 A1    Sep. 21, 2006

Related U.S. Application Data

(63) Continuation-in-part of application No. 11/239,364, filed on Sep. 30, 2005, now abandoned.

(30) Foreign Application Priority Data

Mar. 18, 2005 (JP) .............................. 2005-080640
Feb. 27, 2006 (JP) .............................. 2006-051018

(51) Int. Cl.
  *G05F 1/59*  (2006.01)
  *G05F 1/618*  (2006.01)
(52) U.S. Cl. .................... 323/271; 323/246; 323/285
(58) Field of Classification Search ................. 323/222, 323/224, 225, 272, 282, 284, 237, 242, 243, 323/246
See application file for complete search history.

(56) References Cited

U.S. PATENT DOCUMENTS

| | | | |
|---|---|---|---|
| 5,336,985 A * | 8/1994 | McKenzie ................... | 323/266 |
| 6,232,754 B1 | 5/2001 | Liebler et al. ................ | 323/272 |
| 6,249,111 B1 | 6/2001 | Nguyen ....................... | 323/282 |
| 6,429,633 B1 | 8/2002 | Kajiwara et al. ............ | 323/282 |
| 6,504,351 B2 | 1/2003 | Eagar et al. ................. | 323/282 |

(Continued)

FOREIGN PATENT DOCUMENTS

CN        1383605        12/2002

(Continued)

OTHER PUBLICATIONS

Office Action issued Oct. 30, 2006 is parent U.S. Appl. No. 11/239,364.

(Continued)

*Primary Examiner*—Gary L Laxton
(74) *Attorney, Agent, or Firm*—Staas & Halsey LLP

(57) ABSTRACT

To improve conversion efficiency at a DC-DC conversion time by providing driving units respectively for a plurality of switches and controlling the switches corresponding to a load current, an input voltage, an output voltage and an input/output voltage difference. When synchronously rectifying a plurality of first switches and a plurality of second switches by setting the first switches and the second switches alternately in an ON-state, the plurality of first switches are driven repeatedly in the ON- or OFF-state corresponding to a required output, the plurality of second switches are driven in the ON- or OFF-state in synchronization with the first switches, the driving of part of the plurality of first switches and part or all of the plurality of second switches is stopped corresponding to a load current value, an input voltage value, an output voltage value or an input/output voltage difference value.

16 Claims, 12 Drawing Sheets

U.S. PATENT DOCUMENTS

| | | | |
|---|---|---|---|
| 6,597,157 B1 * | 7/2003 | Boeckmann et al. | 323/242 |
| 6,693,412 B2 | 2/2004 | Ruan et al. | 323/282 |
| 6,894,465 B2 * | 5/2005 | Sutardja et al. | 323/268 |
| 6,930,473 B2 | 8/2005 | Elbanhawy | 323/282 |
| 7,078,882 B2 * | 7/2006 | Weng et al. | 323/224 |
| 2002/0054499 A1 | 5/2002 | Tanaka et al. | |
| 2003/0185025 A1 | 10/2003 | Takemura et al. | |
| 2004/0183510 A1 | 9/2004 | Sutardja et al. | |

FOREIGN PATENT DOCUMENTS

| | | |
|---|---|---|
| JP | 2003-284333 | 10/2003 |

OTHER PUBLICATIONS

Notice of Allowance for Patent dated Sep. 6, 2007 in corresponding Korean Application No. 10-2006-0024985.

* cited by examiner

SWITCHING CONVERTER

INCORPORATION BY REFERENCE

This application is a Continuation-In-Part Application of U.S. application Ser. No. 11/239,364, filed Sept. 30, 2005, now abandoned, and incorporated herein by reference.

BACKGROUND OF THE INVENTION

The invention relates to a technology for conducting synchronous rectification type DC-to-DC conversion or AC-to-DC conversion.

A synchronous rectification type DC-DC converter has hitherto been employed for a variety of electronic devices. The synchronous rectification type DC-DC converter has a function of reducing DC power obtained through conversion by, e.g., an AC adapter from a commercial power source, DC power obtained from a battery and so on down to a voltage suited to an operation of an internal circuit. This synchronous rectification type DC-DC converter has an advantage that efficiency is high while a loss is small.

A synchronous rectification type DC-DC converter is considered to have, for example, a configuration shown in FIG. 13. The DC-DC converter includes an FET 111 serving as a main switch connected to an input terminal 101, an FET 112 serving as a synchronous rectification switch connected between a source terminal of the FET 111 and the ground, an output coil 113, an output capacitor 114, an input capacitor 115, and an FET driver unit 116 for alternately driving the FET 111 and the FET 112.

In the DC-DC converter in FIG. 13, an oscillation control unit 120 controls the FET driver unit 116 in accordance with outputs of an output voltage detection unit 117, an output current detection unit 118 and an operating state control unit 119, and controls an output voltage by changing a duty ratio of the FET 111.

A conceivable configuration of the DC-DC converter is that in the case of requiring a large load current, for example, as shown in FIG. 14, a plurality of output control FETs 91, 92 are provided and driven by a driver circuit 93, and a plurality of synchronous rectification FETs 94, 95 are provided and driven by a driver circuit 96.

Further, a known configuration is that a multiplicity of driver circuits (circuits of controlling the FETs) is prepared to selectively operate the FETs, thus giving flexibility to fluctuations in load. It is, for instance, a DC-DC converter (ADP3205 (Analog Devices IC) etc.) flexible to multiphase.

This type of flexible-to-multiphase DC-DC converter includes the FET and a coil for every phase. Namely, this DC-DC converter includes n-pieces of output control FETs, n-pieces of synchronous rectification FETs and n-pieces of coils for n-phases.

In this system, if the load current is small, circuit efficiency is improved by stopping the driver for driving the phase on a phase-by-phase basis.

Further, the prior arts related to the invention of the application are the following technologies disclosed in Patent documents 1 and 2.

[Patent document 1] Japanese Patent Application Laid-Open Publication No. 2003-284333

[Patent document 2] Japanese Patent Application Laid-Open Publication No. 2003-319649

SUMMARY OF THE INVENTION

As described above, in the DC-DC converter provided with the driver for every phase, if the drivers are stopped, all of the plurality of FETs driven by the drivers can not be used, and hence only the control as simple as stopping the respective phases or stopping the respective phases, wherein optimum conversion efficiency is not necessarily acquired depending on the load and a state of input/output voltages.

Particularly, a mobile-oriented personal computer comes to have a high load in a scene that emphasizes its performance and have a low load in a standby (suspend) status such as being carried, wherein a high efficiency is hard to implement both in the high-load status and in the low-load status due to a large fluctuation in load.

A general type of power source circuit is designed in consideration of a maximum load status and has such a tendency that a converting efficiency abruptly declines in the low-load status. Therefore, it is also considered that in the low-load status, the efficiency is increased by decreasing an oscillation frequency in a way that changes the oscillation system from a PWM (Pulse Width Modulation) system to a PFM (Pulse Frequency Modulation) system.

However, a loss per oscillation is the same, and this loss is required to be reduced.

Such being the case, the invention provides a technology for improving the conversion efficiency at a switching conversion time by providing driving units for a plurality of switches and controlling the respective switches in accordance with a load current value, an input voltage value, an output voltage value and an input/output voltage difference value.

For solving the problems, the invention adopts the following configurations. Namely, a control circuit of the invention is a control circuit of a switching converter for converting an input electric power to an output electric power by setting a plurality of first switches and a second switch alternately to an ON-state, the control circuit including: a plurality of first driving units for respectively driving a plurality of first switches; a second driving unit for driving the second switch; and a selection unit for stopping part of the plurality of first driving units in accordance with a load current value, an input voltage value, an output voltage value or an input/output voltage difference value.

Further, a control circuit of the invention is a control circuit of a switching converter for converting an input electric power to an output electric power by setting a switch and a plurality of second switches alternately to an ON-state, the control circuit including: a first driving unit for driving the first switch; a plurality of second driving units for respectively driving the plurality of second switches; and a selection unit for stopping part or the whole of the plurality of second driving units in accordance with a load current value, an input voltage value, an output voltage value or an input/output voltage difference value.

Moreover, a control circuit of the invention is a control circuit of a switching converter for converting an input electric power to an output electric power by setting a plurality of first switches and a plurality of second switches alternately to an ON-state, the control circuit including: a plurality of first driving units for repeatedly driving the plurality of first switches in an ON- or OFF-state in accordance with a required output; a plurality of second driving units for driving the plurality of second switches in the ON- or OFF-state in synchronization with the first switches; and a selection unit for stopping part of the plurality of first driving units and part or all of the plurality of second driving units in accordance with pieces of predetermined information (a load current value, an output voltage value, an input voltage value or an input/output voltage difference value).

Further, a switching converter of the invention includes:
a plurality of first switches;
a second switch;
a plurality of first driving units for driving each of the plurality of first switches;
a second driving unit for driving the second switch;
a detection unit for detecting a load current value, an input voltage value, an output voltage value or an input/output voltage difference value; and
a selection unit for stopping part of the plurality of first driving units in accordance with a result of the detection by the detection unit.

Still further, a switching converter of the invention includes:
a first switch;
a plurality of second switches;
a first driving unit for driving the first switch;
a plurality of second driving units for driving each of the plurality of second switches;
a detection unit for detecting a load current value, an input voltage value, an output voltage value or an input/output voltage difference value; and
a selection unit for stopping part or all of the plurality of second driving units in accordance with a result of the detection by the detection unit.

Moreover, a switching converter of the invention includes:
a plurality of first switches;
a plurality of second switches;
a plurality of first driving units for repeatedly driving the plurality of first switches in an ON- or OFF-state in accordance with a required output;
a plurality of second driving units for driving respectively the plurality of second switches in the ON-state in synchronization with the first switches;
a detection unit for detecting pieces of predetermined information (a load current value, an output voltage value, an input voltage value or an input/output voltage difference value); and
a selection unit for stopping part of the plurality of first driving units and part or all of the plurality of second driving units in accordance with the information detected by the detection unit.

The first switch may be an FET, wherein a drain terminal is connected to an input terminal, a source terminal is connected to the second switch, and a gate terminal is connected to the first driving unit. A plurality of FETs may be connected in parallel between the input terminal and the second switch.

The second switch may be an FET, wherein a drain terminal is connected to the first switch, a source terminal is connected to the ground, and a gate terminal is connected to the second driving unit. A plurality of FETs may be connected in parallel between the second switch and the ground.

Further, the switching converter may include a coil of which one terminal is connected to the first switch (the source terminal of the FET) and to the second switch (the drain terminal of the FET) and of which the other terminal is connected to the output terminal, and also a smoothing capacitor connected between the output terminal and the ground.

Moreover, a switching circuit of the invention includes: an A-coil connected to an output terminal; a first A-switch for switching electric power outputted via the A-coil; a second A-switch for making rectification so as to become an ON-state alternately with the first A-switch; a B-coil connected in series to the A-coil; a first B-switch for switching the electric power outputted via the B-coil and the A-coil; and a second B-switch for making the rectification so as to become an ON-state alternately with the first B-switch.

Still further, a switching converter of the invention includes: an A-coil connected to an output terminal; a first A-switch for switching electric power outputted via the A-coil; a second A-switch for making rectification so as to become an ON-state alternately with the first A-switch; an A-driving unit for driving the first A-switch and the second A-switch alternately; a B-coil connected in series to the A-coil; a first B-switch for switching the electric power outputted via the B-coil and the A-coil; a second B-switch for making the rectification so as to become an ON-state alternately with the first B-switch; a B-driving unit for driving the first B-switch and the second B-switch alternately; and a selection unit for causing the A-driving unit and the B-driving unit to drive selectively.

In the switching converter, the first A-switch and the second A-switch may be set to have a larger capacity than the first B-switch and the second B-switch have, and
the selection unit may drive the A-driving unit when an output load is higher than a predetermined value and may drive the B-driving unit when the output load is equal to or lower than the predetermined value.

In the switching converter, the A-coil may be set to have a larger capacity than the B-coil, and
the selection unit may drive, corresponding to a load on the output side, the A-driving unit when the load is higher than a predetermined value and may drive the B-driving unit when the load is equal to or lower than the predetermined value.

The A-coil may have a lower inductance than the B-coil.
In the switching converter,
the A-driving unit may be set to have a larger capacity than the B-driving unit, and
the selection unit may drive, corresponding to a load on the output side, the A-driving unit when the load is higher than a predetermined value and may drive the B-driving unit when the load is equal to or lower than the predetermined value.

In the switching converter, the A-coil may extend from one terminal of the single coil up to a middle point thereof, and the B-coil may extend from the middle point up to the other terminal thereof.

In the switching converter,
the selection unit may receive information representing an operating state of a load-sided circuit, and may drive the A-driving unit or the B-driving unit in accordance with the information.

The selection unit may drive the A-driving unit or the B-driving unit in accordance with an output current.

Further, a switching converter of the invention includes:
a first A-FET having a drain terminal that is connected to an input terminal;
a second A-FET having a drain terminal that is connected to a source terminal of the first A-FET, and a source terminal that is connected to the ground;
an A-driving unit connected to gate terminals of the first A-FET and of the second A-FET, and driving the first A-FET and the second A-FET alternately;
an A-coil having one terminal that is connected to an A-oscillation part to which the source terminal of the first A-FET and the drain terminal of the second A-FET are connected, and having the other terminal that is connected to an output terminal;
a first B-FET having a drain terminal that is connected to an input terminal;
a second B-FET having a drain terminal that is connected to the source terminal of the first B-FET and a source terminal that is connected to the ground;

a B-driving unit connected to gate terminals of the first B-FET and of the second B-FET, and driving the first B-FET and the second B-FET alternately;

a B-coil having one terminal that is connected to an B-oscillation part to which the source terminal of the first B-FET and the drain terminal of the second B-FET are connected, and having the other terminal that is connected to A-oscillation part; and a selection unit for selectively driving the A-driving unit and the B-driving unit.

Moreover, an electronic device of the invention is a device having a switching converter and a load operating by an output from the switching converter, the switching converter including:

an A-coil connected to the output terminal;

a first A-switch for switching electric power outputted via the A-coil;

a second A-switch for making rectification so as to become an ON-state alternately with the first A-switch;

an A-driving unit for driving the first A-switch and the second B-switch alternately;

a B-coil connected in series to the A-coil;

a first B-switch for switching the electric power outputted via the B-coil and the A-coil;

a second B-switch for making the rectification so as to become an ON-state alternately with the first B-switch;

an A-driving unit for driving the first B-switch and the second B-switch alternately; and a selection unit for causing the A-driving unit and the B-driving unit to drive selectively.

According to the invention, it is possible to improve the conversion efficiency at the switching conversion time by providing the driving units respectively for the plurality of switches and controlling the respective switches in accordance with the load current value, the input voltage value, the output voltage value and the input/output voltage difference value.

DETAILED DESCRIPTION OF THE PREFERRED EMBODIMENT

A best mode for carrying out the invention will hereinafter be described with reference to the drawings. Configurations of the following embodiments are exemplifications, and the invention is not limited to the configurations of the embodiments.

First Embodiment

Figure 1:
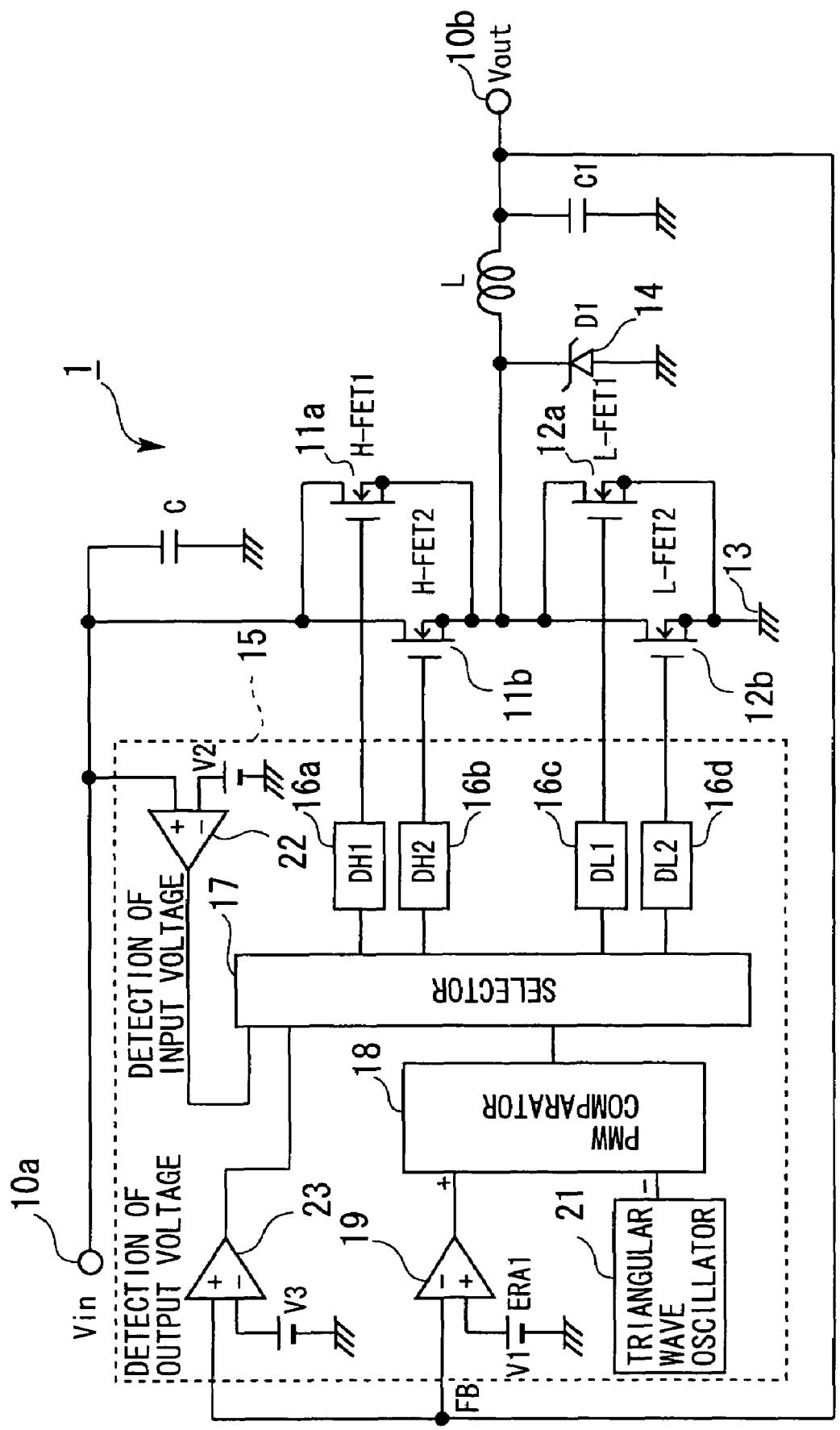
FIG. 1 is a diagram of an outline of a first embodiment of the invention.

FIG. 1 is a diagram of an outline of a synchronous rectification type switching converter (DC-DC converter) according to the invention. FETs (Field-Effect Transistors) 11a, 11b defined as first switches are provided in parallel between an input terminal 10a and an output terminal 10b of this DC-DC converter 1, and an inductor L is disposed on the side of the output terminal 10b. Further, FETs 12a, 12b as second switches are provided in parallel between this inductor L and an earthed point 13. Herein, the first and second switches involve using the FETs and may also be other types of switching elements without being limited to the FETs.

The FETs 11a, 11b as the first switches might be referred to as output control switches, output control FETs, main switches, main-side FETs, high-side switches, high-side FETs, and so on.

The FETs 12a, 12b as the second switches might be referred to as synchronous rectification switches, synchronous rectification FETs, synchronous-rectification-side FETs, low-side switches, low-side FETs, and so forth.

Moreover, a diode 14a is disposed in parallel with the synchronous rectification FETs 12a, 12b.

Then, this DC-DC converter 1 is provided with a control circuit 15 for controlling the output control FETs 11a, 11b and the synchronous rectification FETs 12a, 12b so as to set these FETs in an ON-state, alternately.

Figure 2:
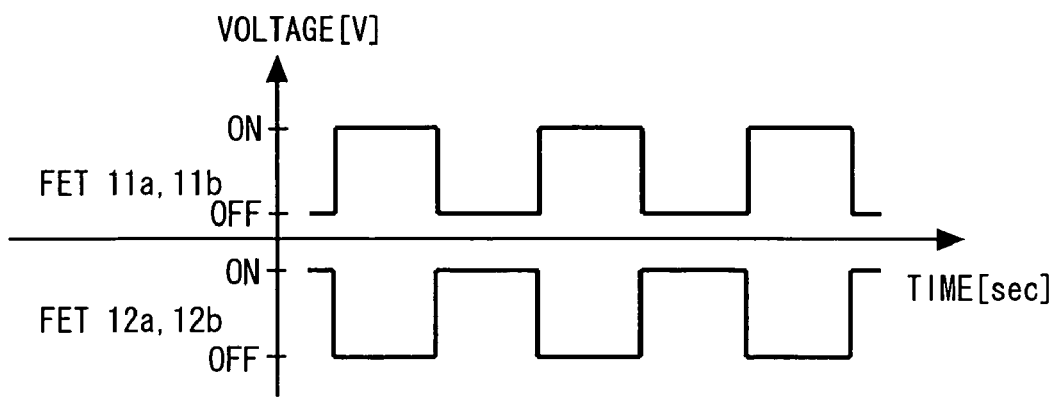
FIG. 2 is a diagram showing ON/OFF time changes of an output control FET and a synchronous rectification FET.

FIG. 2 is a diagram showing ON/OFF time changes of the output control FETs 11a, 11b and the synchronous rectification FETs 12a, 12b.

Thus, an electric current from the input terminal 10a is kept flowing during only a period of the ON-state of the output control FETs 11a, 11b, then smoothed by the inductor L and a capacitor C and thus outputted, whereby an input voltage is converted into an output voltage corresponding to a duty ratio of the output control FETs 11a, 11b.

The control circuit 15 includes drivers 16a-16d for respectively driving the output control FETs 11a, 11b and the synchronous rectification FETs 12a, 12b, a selector 17 for selectively stopping the drivers 16a-16d, and a PWM comparator 18 for supplying pulse signals to the respective drivers 16a-16d via the selector 17.

An input from a differential amplifier 19 and a signal from a triangular wave oscillator 21 are inputted to the PWM comparator 18.

The differential amplifier 19 receives an input of a reference voltage V1 and an input of an output voltage from the output terminal 10b, and inputs an error signal representing a deviation of the output voltage from the reference voltage V1 to the PWM comparator 18. On the other hand, the triangular wave oscillator 21 generates and inputs a triangular wave having a predetermined frequency to the PWM comparator 18.

With this operation, the PWM comparator 18 outputs, to the selector 17, the pulse signal having a pulse width based on the error signal given from the differential amplifier 19 at a timing of the triangular wave inputted from the triangular wave oscillator 21. Herein, the PWM comparator 18 in this example, based on the error signal, outputs the pulse signal having a wider pulse width as the output voltage gets lower than the reference voltage V1, and generates the pulse signal having a narrower pulse width as the output voltage gets higher than the reference voltage V1. Then, the selector 17 inputs the pulse signals to the drivers 16a, 16b (a first driving unit), and sets ON/OFF the output control FETs 11a, 11b as shown in FIG. 2. Simultaneously, the selector 17 substantially inverts and thus inputs the pulse signals given from the PWM comparator 18 to the drivers (a second driving unit) 16c, 16d, and sets ON/OFF the synchronous rectification FETs 12a, 12b as shown in FIG. 2. Accordingly, the duty ratios of the output control FETs 11a, 11b and the synchronous rectification FETs 12a, 12b are adjusted corresponding to the output voltage, and the output voltage is feedback-controlled so as to become a predetermined voltage value. Herein, the drivers 16a-16d, without being limited to the control at a timing when the ON/OFF settings of the output control FETs 11a, 11b and the synchronous rectification FETs 12a, 12b are strictly inverted, may have a period when setting both types of FETs OFF simultaneously in a way that takes account of a through-current.

Further, the control circuit 15 includes a differential amplifier (input voltage detection unit) 22 for detecting the input voltage, and a differential amplifier (output voltage detection unit) 23 for detecting the output voltage. The differential amplifier 22 inputs an error signal representing a deviation of the input voltage from a reference voltage V2 to the selector 17, and the differential amplifier 23 inputs an error signal representing a deviation of the output voltage from a reference voltage V3 to the selector 17. Thus, a difference (I/O voltage difference) between the input voltage and the output voltage is obtained by detecting the input voltage and the output voltage. Namely, in the first embodiment, the differential amplifiers 22 and 23 correspond to a voltage difference detection unit.

Then, the selector 17 selectively stops the drivers 16a-16d on the basis of the difference (I/O voltage difference) between the input voltage and the output voltage. Namely, the selector 17 does not input the pulse signal to the driver to be stopped so that the FET is not charged with a gate voltage.

Figure 3:
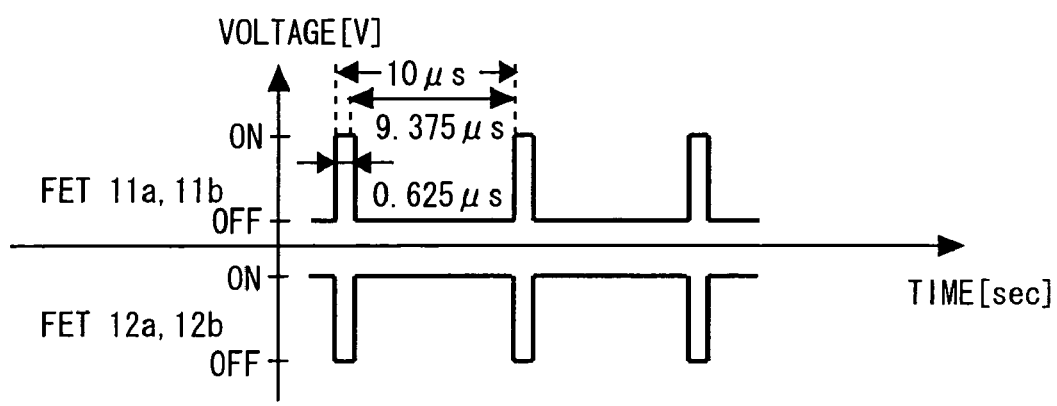
FIG. 3 is a diagram showing the ON/OFF time changes of the output control FET and the synchronous rectification FET when an input/output voltage difference is large.

For instance, when the frequency of the pulse signal outputted from the triangular wave oscillator 21 is 100 kHz, the input voltage is 16 V and the output voltage is 1V, the ON/OFF time of the output control FETs 11a, 11b and of the synchronous rectification FETs 12a, 12b becomes as shown in FIG. 3.

Figure 4:
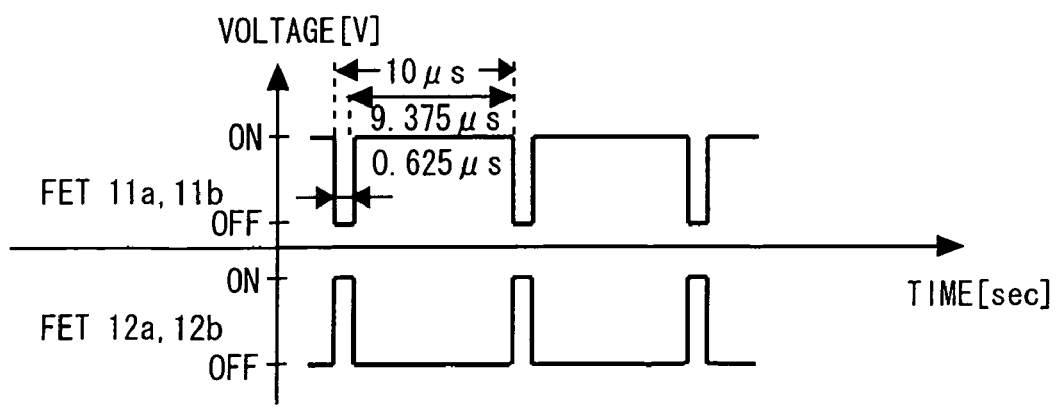
FIG. 4 is a diagram showing the ON/OFF time changes of the output control FET and the synchronous rectification FET when the input/output voltage difference is small.

Similarly, when the input voltage is 16V and the output voltage is 15V, the ON/OFF time of the output control FETs 11a, 11b and of the synchronous rectification FETs 12a, 12b becomes as shown in FIG. 4.

As shown in FIG. 3, if there is a large I/O voltage difference (15 V), the ON-time of the output control FETs 11a, 11b is as short as 0.625 μs, and a product of the electric power applied to the output control FETs 11a, 11b is small. Further, as shown in FIG. 4, if the I/O voltage difference is small (1 V), the ON-time of the output control FETs 11a, 11b is as long as 9.375 μs, and the product of the electric power applied to the output control FETs 11a, 11b is large. Therefore, if the DC-DC converter is a converter capable of converting the output voltage into 1 V trough 15 V when the input voltage is 16 V, the output control FETs 11a, 11b are so designed as to withstand the minimum I/O voltage difference (1 V). Hence, as shown in FIG. 3, if the I/O voltage difference increases and falls within an allowable range of one output control FET, switching can be done by only the other even when stopping one of the output control FETs 11a, 11b.

For example, when stopping the output control FET 11a, a drain current of the output FET 11b comes to 10 A, and, if the output control FET 11b withstands the drain current of 10 A for 2 μs, it can be said that the output control FET 11b is capable of switching with the I/O voltage difference that is on the order of 10 V. Such being the case, the selector 17 is set so as to stop the driver 16a for the output control FET 11a if the I/O voltage difference is equal to or larger than 10 V and to drive the drivers 16a, 16b for both of the output control FETs 11a and 11b if the I/O voltage difference is less than 10V. Note that these numerical values can be arbitrarily set depending on the FETs to be used, a load, and so on. Further, the example has exemplified the case of stopping one of the two output control FETs 11a, 11b, and may also adopt such a configuration that a larger number of output control FETs are provided, part of these FETs are stopped, and the remaining FETs conduct switching.

Thus, the minimum number of elements necessary for switching is determined by the ON-time of the output control FET, and hence, in the first embodiment, the selector 17 sets so that the pulse signals are selectively supplied to the drivers of which the number corresponds to the I/O voltage difference inputted by the differential amplifiers 22, 23. Namely, the selector 17 stops the driver for the output control FETs exceeding the necessary number of FET. Note that a method of determining specifically which driver should be stopped corresponding to the necessary number of FETs can be arbitrarily set.

On the other hand, as shown in FIG. 3, if the I/O voltage difference is large (15 V), the ON-time of the synchronous rectification FETs 12a, 12b is as long as 9.375 μs, and a product of electric power applied to the synchronous rectification FETs 12a, 12b is large. Further, as shown in FIG. 4, if the I/O voltage difference is small (1 V), the ON-time of the synchronous rectification FETs 12a, 12b is as short as 0.625 μs, and the product of the electric power applied to the synchronous rectification FETs 12a, 12b is small. Accordingly, if the DC-DC converter is the converter capable of converting the output voltage into 1 V trough 15 V when the input voltage is 16 V, the synchronous rectification FETs 12a, 12b are so designed as to withstand the maximum I/O voltage difference (15 V). Hence, as shown in FIG. 4, if the I/O voltage difference decreases and falls within an allowable range of one synchronous rectification FET, switching can be done by only the other even when stopping one of the synchronous rectification FETs 12a, 12b.

Moreover, if the electric power applied to the synchronous rectification FETs 12a, 12b is small and if a power loss is small enough to be ignorable when this electric power is applied to the diode 14, all the synchronous rectification FETs 12a, 12b may be stopped.

For example, when stopping the synchronous rectification FET 12a, the drain current of the synchronous rectification FET 12b comes to 10 A, and the synchronous rectification FET 12b, if able to withstand the drain current of 10 A for 2 μs, can be said to be capable of switching with the I/I voltage difference of 3 V. Such being the case, the selector 17 is set so as to stop the drivers 16a, 16d for both of the synchronous rectification FETs 12a, 12b if the I/O voltage difference is less than 1.5 V, to stop the driver 16*c* for the synchronous rectification FET 12*a* if the I/O voltage difference is equal to or larger than 1.5 V but is equal to or smaller than 3 V, and to drive the drivers 16*c*, 16*d* for both of the synchronous rectification FETs 12*a*, 12*b* if the I/O voltage difference exceeds 3V. Note that these numerical values can be arbitrarily set depending on the FETs to be used, a load, and so on. Further, the example has exemplified the case of stopping one or two of the two synchronous rectification FETs 12*a*, 12*b*, and may also adopt such a configuration that a larger number of synchronous rectification FETs are provided, part of these FETs are stopped, and the remaining FETs conduct switching.

Thus, the minimum number of the elements required for switching is determined depending on the ON-time of the synchronous rectification FETs, and hence, in the first embodiment, the selector 17 sets to supply the pulse signals selectively to the drivers of which the number corresponds to the I/O voltage difference inputted by the differential amplifiers 22, 23. Namely, the selector 17 stops the drivers for the synchronous rectification FET exceeding the necessary number of FET. Note that the method of determining specifically which driver should be stopped, can be arbitrarily set.

With this setting, part of the drivers 16*a*-16*d* are stopped when the load is light with the result that the electric power consumed by those drivers can be reduced, thereby attaining the power-saving, i.e., an improvement of the converting efficiency.

For example, there are provided four pieces of driver circuits having power consumption of 25 mW per piece (namely, the power consumption of all the driver circuits is given by 25 mW×4=100 mW), and, when operating these four driver circuits, there must be a 20% loss with respect to a load of load power given by 5 V×100 mA=500 mW. Herein, in the case of driving only two driver circuits while stopping part of these driver circuits, an improvement of a 50 mW power loss can be attained. That is, the power loss can be reduced down to 10% from 20% with respect to the load.

As described above, according to the first embodiment, the driver prepared for every FET is stopped or driven corresponding to the state of the I/O voltage difference, thereby enabling the optimum drive control and the improvement of the efficiency of the DC-DC converter.

Note that the first embodiment has adopted the configuration that the selector 17 stops part of the drivers corresponding to the I/O voltage difference and may also take, without being limited to this configuration, such a configuration that the selector 17 stops part of the drivers corresponding to the input voltage or the output voltage.

For instance, if the output voltage takes substantially a fixed value, the minimum number of the FETs required can be determined in the same way as described above from the difference between the output voltage assumed to be this value and the input voltage, and therefore, with the output voltage detection unit (differential amplifier) 23 omitted, the selector 17 may stop the drivers of which the number corresponds to the input voltage of the input voltage detection unit (difference amplifier) 22.

Moreover, for instance, if the input voltage takes substantially a fixed value, the minimum number of the FETs required can be determined in the same way as described above from the difference between the input voltage assumed to be this value and the output voltage, and therefore, with the input voltage detection unit (differential amplifier) 22 omitted, the selector 17 may stop the drivers of which the number corresponds to the output voltage of the output voltage detection unit (difference amplifier) 23.

Second Embodiment

Figure 5:
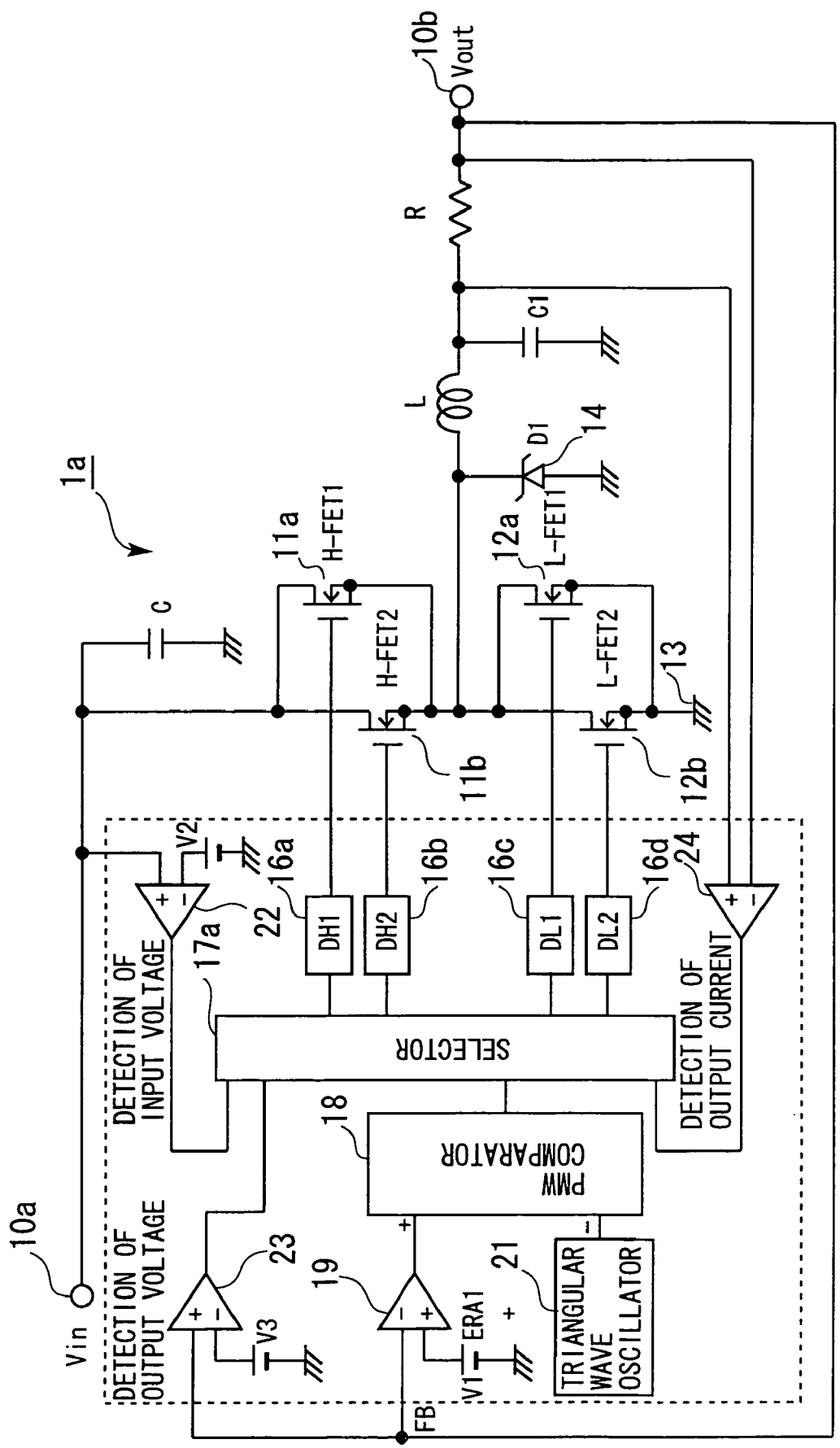
FIG. 5 is a diagram of an outline of a second embodiment of the invention.

FIG. 5 is a diagram of an outline of a DC-DC converter shown by way of a second embodiment. The second embodiment is different from the first embodiment in terms of a point that the driver to be stopped is determined corresponding to a load current, and other configurations are the same. Therefore, the same components as those in the first embodiment are marked with the same numerals and symbols, and the repetitive explanations are omitted in principle.

As shown in FIG. 5, a DC-DC converter 1*a* in the second embodiment includes a load current detector 24 that detects a current flowing across a resistor R in the vicinity of an output terminal 10*b*, i.e., detects the output current (load current), wherein a signal corresponding to this output current is inputted to a selector 17*a*.

Then, the selector 17*a* in the second embodiment stops the driver on the basis of this load current and the I/O voltage difference described above.

Namely, a relationship between the I/O voltage difference and the number of the drivers to be stopped is determined by the load current, and hence, in the DC-DC converter 1*a* according to the second embodiment, the selector 17*a* is set to stop the driver based on the relationship corresponding to this load current.

For instance, if the load current is 12 A with respect to the drivers 16*a*, 16*b* on the output control side, the selector 17*a* is set to stop the driver 16*a* for the output control FET 11*a* when the I/O voltage difference is equal to or larger than 12 V, to drive the drivers 16*a*, 16*b* for both of the output control FETs 11*a* and 11*b* when the I/O voltage difference is less than 12 V, and is further set to, if the load current is 10 A, stop the driver 16*a* for the output control FET 11*a* when the I/O voltage difference is equal to or larger than 10 V and to drive the drivers 16*a*, 16*b* for both of the output control FETs 11*a* and 11*b* when the I/O voltage difference is less than 10 V.

Then, if the load current is 12 A with respect to the drivers 16*c*, 16*d* on the synchronous rectification side, the selector 17 is set to stop the drivers 16*c*, 16*d* for both of the synchronous rectification FETs 12*a*, 12*b* when the I/O voltage difference is less than 1.1 V, to stop the driver 16*c* for the synchronous rectification FET 12*a* when the I/O voltage difference is equal to larger than 1.1 V but is equal to or smaller than 2 V, and to drive the drivers 16.*c*, 16*d* for both of synchronous rectification FETs 12*a*, 12*b* when the I/O voltage difference exceeds 2 V, and is further set to, if the load current is 10 A, stop the drivers 16*c*, 16*d* for both of the synchronous rectification FETs 12*a*, 12*b* when the I/O voltage difference is less than 1.5V, to stop the driver 16*c* for the synchronous rectification FET 12*a* when the I/O voltage difference is equal to larger than 1.5 V but is equal to or smaller than 3 V, and to drive the drivers 16*c*, 16*d* for both of synchronous rectification FETs 12*a*, 12*b* when the I/O voltage difference exceeds 3 V. Note that these numerical values can be arbitrarily set depending on the FETs to be used, a load, and so on. Further, the example has exemplified the case of stopping one of the two output control FETs 11*a*, 11*b*, and the case of stopping one or two of the two synchronous rectification FETs 12*a*, 12*b*, and may also adopt such a configuration that a larger number of FETs are provided, part of these FETs are stopped, and the remaining FETs conduct switching.

Moreover, the second embodiment has adopted the configuration that the selector 17 stops part of the drivers corresponding to the I/O voltage difference and the load current and may also take, without being limited to this configuration, such a configuration that the selector 17 stops part of the drivers corresponding to the input voltage/the load current, the output voltage/load current, or only the load current.

For instance, if the output voltage takes substantially a fixed value, the minimum number of the FETs required can be determined in the same way as described above from the difference between the output voltage assumed to be this value and the input voltage and from the load current, so that the selector 17, with the output voltage detection unit (differential amplifier) 23 omitted, may stop the drivers of which the number corresponds to the input voltage detected by the input voltage detection unit (differential amplifier) 22 and the load current detected by the load current detection unit 24.

Further, if the input voltage takes substantially a fixed value, the minimum number of the FETs required can be determined in the same way as described above from the difference between the input voltage assumed to be this value and the output voltage and from the load current, so that the selector 17, with the input voltage detection unit (differential amplifier) 22 omitted, may stop the drivers of which the number corresponds to the output voltage detected by the output voltage detection unit (differential amplifier) 23 and the load current detected by the load current detection unit 24.

Moreover, if the I/O voltage difference takes substantially a fixed value, the minimum number of the FETs required can be determined in the same way as described above from the I/O voltage difference assumed to be this value and from the load current, so that the selector 17, with the input voltage detection unit (differential amplifier) 22 and the output voltage detection unit (differential amplifier) 23 omitted, may stop the drivers of which the number corresponds to the load current detected by the load current detection unit 24.

Third Embodiment

Figure 6:
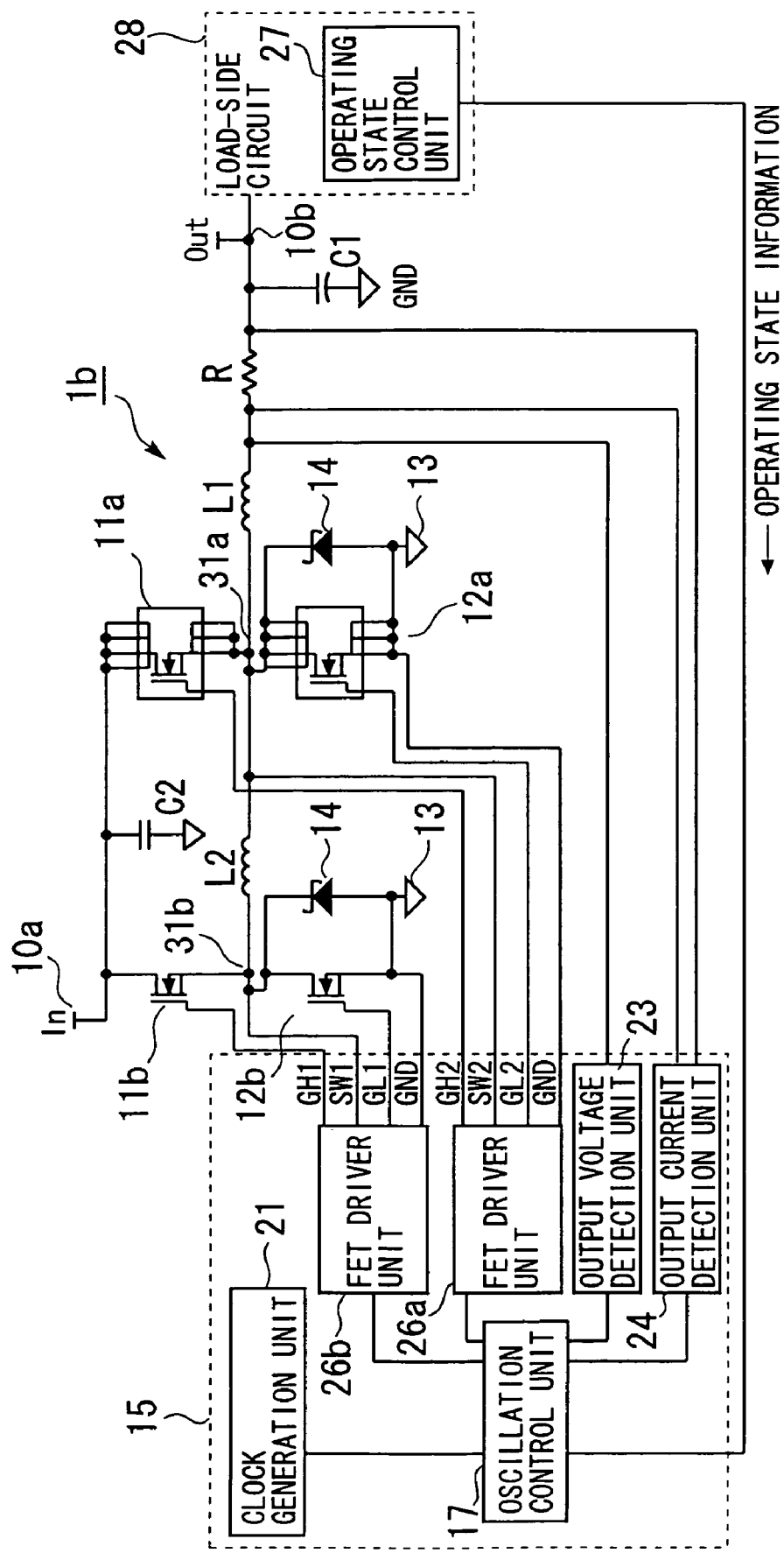
FIG. 6 is a diagram of an outline in a third embodiment of the invention.

FIG. 6 is a diagram showing an outline of the switching converter (DC-DC converter) by way of a third embodiment of the invention.

In a DC-DC converter 1b in the third embodiment, an FET (Field-Effect Transistor) 11a defined as a first A-switch and an FET 11b defined as a first B-switch are provided in parallel between an input terminal 10a and an output terminal 10b, and inductors (coils) L1, L2 are disposed on the side of this output terminal 10b. Further, an FET 12a defined as a second A-switch and an FET 12b defined as a second B-switch are provided in parallel between the coils L1, L2 and a ground point 13.

Namely, the DC-DC converter 1b includes an FET 11a (corresponding to a first A-FET) of which a drain terminal is connected to the input terminal 10a, an FET 12a (corresponding to a second A-FET) of which a drain terminal is connected to a source terminal of the FET 11a and of which a source terminal is connected to the ground, a coil L1 (corresponding to an A-coil) having one terminal that is connected to an oscillation part 31a (corresponding to an A-oscillation part) to which the source terminal of the FET 11a and the drain terminal of the FET 12a are connected, and having the other terminal that is connected to the output terminal 10b, an FET 11b (corresponding to a first B-FET) of which a drain terminal is connected to the input terminal 10a, an FET 12b (corresponding to a second B-FET) of which a drain terminal is connected to the source terminal of the FET 11b and of which a source terminal is connected to the ground, and a coil L2 (corresponding to a B-coil) having one terminal that is connected to an oscillation part 31b (corresponding to a B-oscillation part)) to which the source terminal of the FET 11b and the drain terminal of the FET 12b are connected, and having the other terminal that is connected to the oscillation part 31a.

Herein, the first and second switches involve using the FETs, however, other switching elements may also be usable without being limited to the FETs.

The FETs 11a, 11b serving as the first switches might also be called output control switches, output control FETs, main switches, main-side FETs, high-side switches, high-side FETs, and so on.

The FETs 12a, 12b serving as the second switches might also be called synchronous rectification switches, synchronous rectification FETs, synchronous rectification side switches, synchronous rectification side FETs, low-side switches, low-side FETs, and so forth.

Diodes 14 are disposed in parallel with the synchronous rectification FETs 12a, 12b.

Then, a control circuit 15 drives the FET 11a and the FET 12a so that these FETs become an ON-state alternately or drives the FET 11b and the FET 12b so that these FETs become an ON-state alternately.

FIG. 2 is a diagram showing ON/OFF time changes of the output control FETs 11a, 11b and the synchronous rectification FETs 12a, 12b.

Thus, the output control FETs 11a, 11b output a voltage applied to the input terminal 10a during the ON-state set by the control circuit 15, and the voltage is smoothed by the inductors L1, L2 and by a capacitor C1. Namely, the DC-DC converter 1b converts the input voltage into an output voltage corresponding to a duty ratio of the output control FETs 11a, 11b.

The control circuit 15 includes an FET driver (corresponding to an A-driving unit) 26a connected between the gate and the source of the output control FET 11a and the synchronous rectification FET 12a and driving the FET 11a and the FET 12a so that these FETs become the ON-state alternately, an FET driver (corresponding to a B-driving unit) 26b connected between the gate and the source of the output control FET 11b and the synchronous rectification FET 12b and driving the FET 11b and the FET 12b so that these FETs become the ON-state alternately, detection units 23, 24 for detecting the outputs, an oscillation control unit (corresponding to a selection unit) 17 for controlling the FET drivers 26a, 26b in accordance with the outputs etc, and a clock generation unit 21 for generating a clock.

The output voltage detection unit 23 serves to detect the output voltage of the converter 1b and is constructed of, for example, a differential amplifier etc that inputs, to the oscillation control unit 17, a signal (output deviation signal) corresponding to a difference between the output-side voltage of the coil L1 and a reference voltage.

The output current detection unit 24 serves to detect the output current of the converter 1b and is constructed of, for instance, a differential amplifier etc that inputs, to the oscillation control unit 17, a signal (output current signal) corresponding to a voltage difference between both of the terminals of a low-resistance R provided on the side of the output terminal 10b.

The oscillation control unit 17 generates a pulse signal having a width corresponding to the output deviation signal from the output voltage detection unit 23 at a timing of the clock inputted from the clock generation unit 21, selectively inputs the pulse signal to the FET drivers 26a, 26b, and sets ON/OFF the output control FETs 11a, 11b as shown in FIG. 2. Herein, the oscillation control unit 17 outputs the pulse signal to the FET driver 26a when the output current signal is equal to or larger than a predetermined value, and outputs the pulse signal to the FET driver 26b when the output current signal is less than the predetermined value. For example, the oscillation control unit 17 has a logic circuit outputting Lo when the output current signal is less than the predetermined value and outputting Hi when the output current signal is equal to or higher than the predetermined value, and a selector that outputs the pulse signal to the FET driver 26*a* when the output of the logic circuit is Hi and outputs the pulse signal to the FET driver 26*b* when the output of the logic circuit is Lo. Note that the predetermined value is not limited to one value and may take a plurality of values. For example, there may be employed the logic circuit that changes the output to Lo when the output current signal is less than a first threshold value and changes the output to Hi when the output current signal is equal to or larger than a second threshold value (where the first threshold value <the second threshold value), and keeps the present state when between the first threshold value and the second threshold value.

Moreover, in the case of existence of an operating state control unit 27 grasping an operating state of the load-side circuit 28, the oscillation control unit 17 may receive a piece of operating state information from the operating state control unit 27, and may output the pulse signal to the FET driver 26*a* or the FET driver 26*b* on the basis of the operating state information.

In this case, the oscillation control unit 17 employs, for instance, a logic circuit constructed to output, to the selector, Lo in the case of the operating state information representing, e.g., the standby status and a power save mode and to output Hi in the case of operating state information representing a normal mode.

Further, if the electric power of the input terminal 10*a* is proportional to a magnitude of the load, a detection unit for detecting the input may be provided, and the oscillation control unit 17 may output the pulse signal to the FET driver 26*a* or the FET driver 26*b* in accordance with the input.

It is to be noted that a loss in the general type of switching converter can be classified roughly into a loss occurred when the control circuit drives the FET, and a loss occurred when the load current flows to the FET/coil, etc. At this time, the former is dominant in the case of the low load, but the latter is dominant in the case of the high load.

Therefore, it is effective for increasing the efficiency that the small-sized FET having a small gate capacitance is used in the circuit based on the premise of the low load, and the large-sized FET exhibiting low ON-resistance is employed in the circuit based on the premise of the high load.

Moreover, a coil having the high inductance that can delay an oscillation frequency is used in the circuit based on the premise of the low load, and a coil having the low high inductance is employed for increasing responsiveness to a fluctuation of the load in a power source circuit based on the premise of the high load.

Such being the case, in the third embodiment, the FET 11*a* (corresponding to the first A-switch) and the FET 12*a* (corresponding to the second A-switch) are set to have the larger capacitance than the FET 11*b* (corresponding to the first B-switch) and the FET 12*b* (corresponding to the second B-switch) have.

Moreover, in the third embodiment, the coil L1 is set to have the larger capacitance than the coil L2 has, and is further set to have the lower inductance than the coil L2 has.

Still further, the FET 11*b* and the FET 12*b* have a smaller capacitance than the FET 11*a* and the FET 12*a* have, and hence the efficiency and an packaging area can be optimized by setting the capacitance of the FET driver 26*b* smaller than the FET driver 26*a*.

As discussed above, the DC-DC converter in the third embodiment selectively drives any one group of the large-capacitance switches (11*a*, 12*a*) and the small-capacitance switches (11*b*, 12*b*) in accordance with the load state, and therefore the power source circuit having the high efficiency and the high responsiveness can be actualized even in any state of the low-load state and the high-load state.

In particular, the DC-DC converter in the third embodiment employs the coil L1 having the low inductance when switching in the high-load state and uses the coil L1 and the coil L2 when switching in the low-load state, and the high inductance is obtained, whereby the oscillation frequency can be set low, and much higher efficiency at the low-load time can be actualized.

Figure 7:
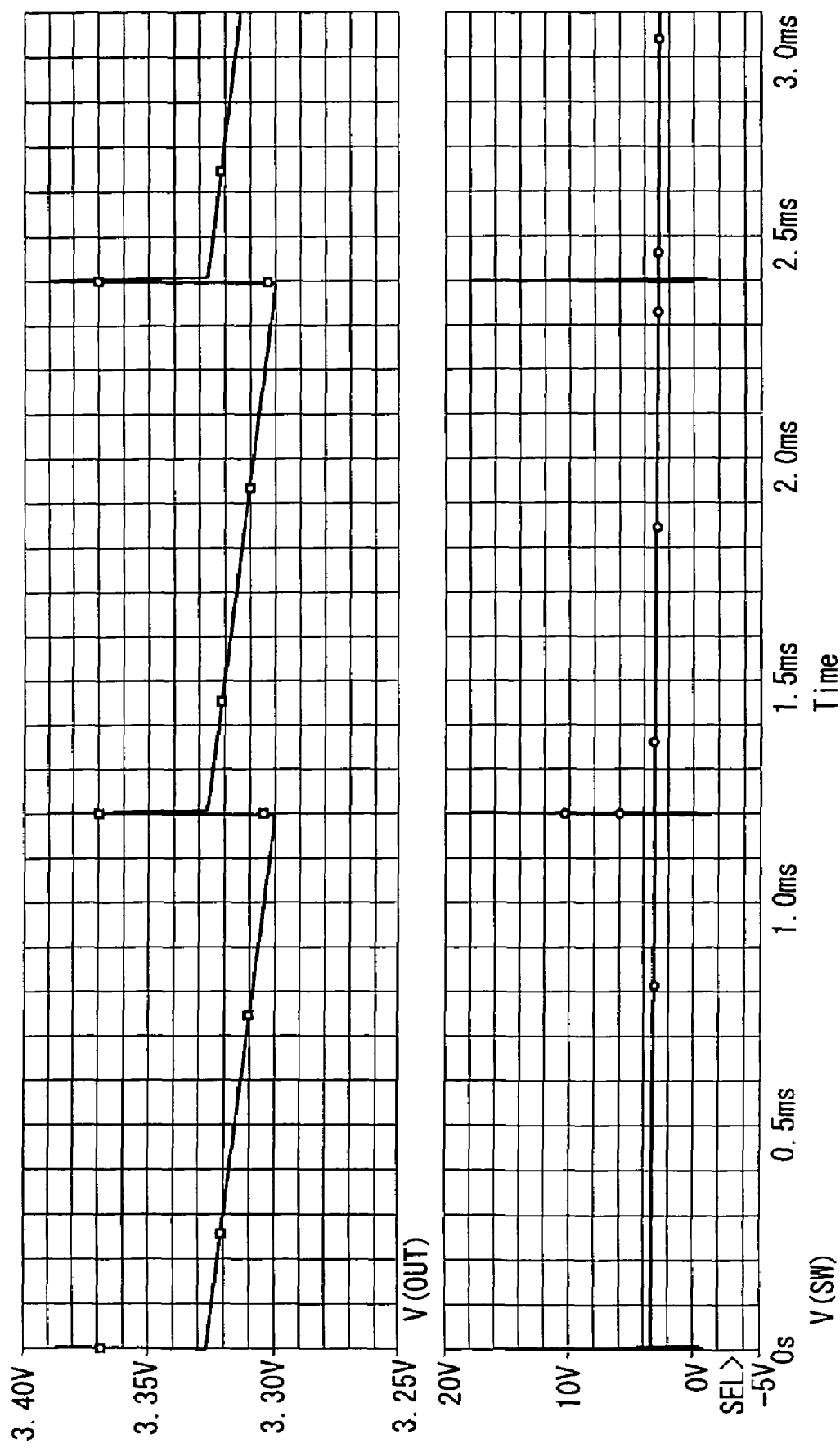
FIG. 7 is a diagram showing an output voltage and an oscillation waveform in a DC-DC converter in the related background art.
Figure 13:
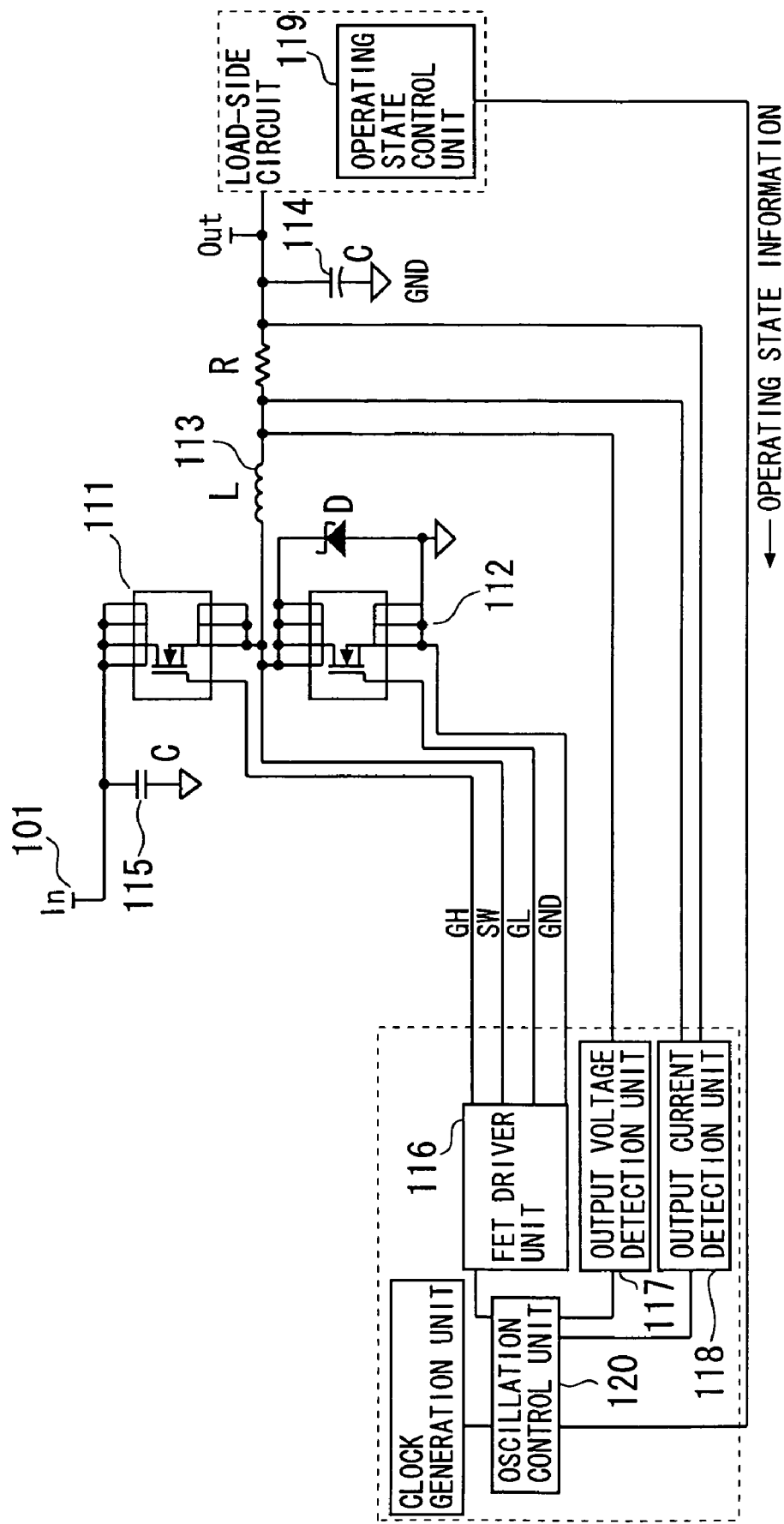
FIG. 13 is a diagram of an outline of a DC-DC converter in the related background art.
Figure 14:
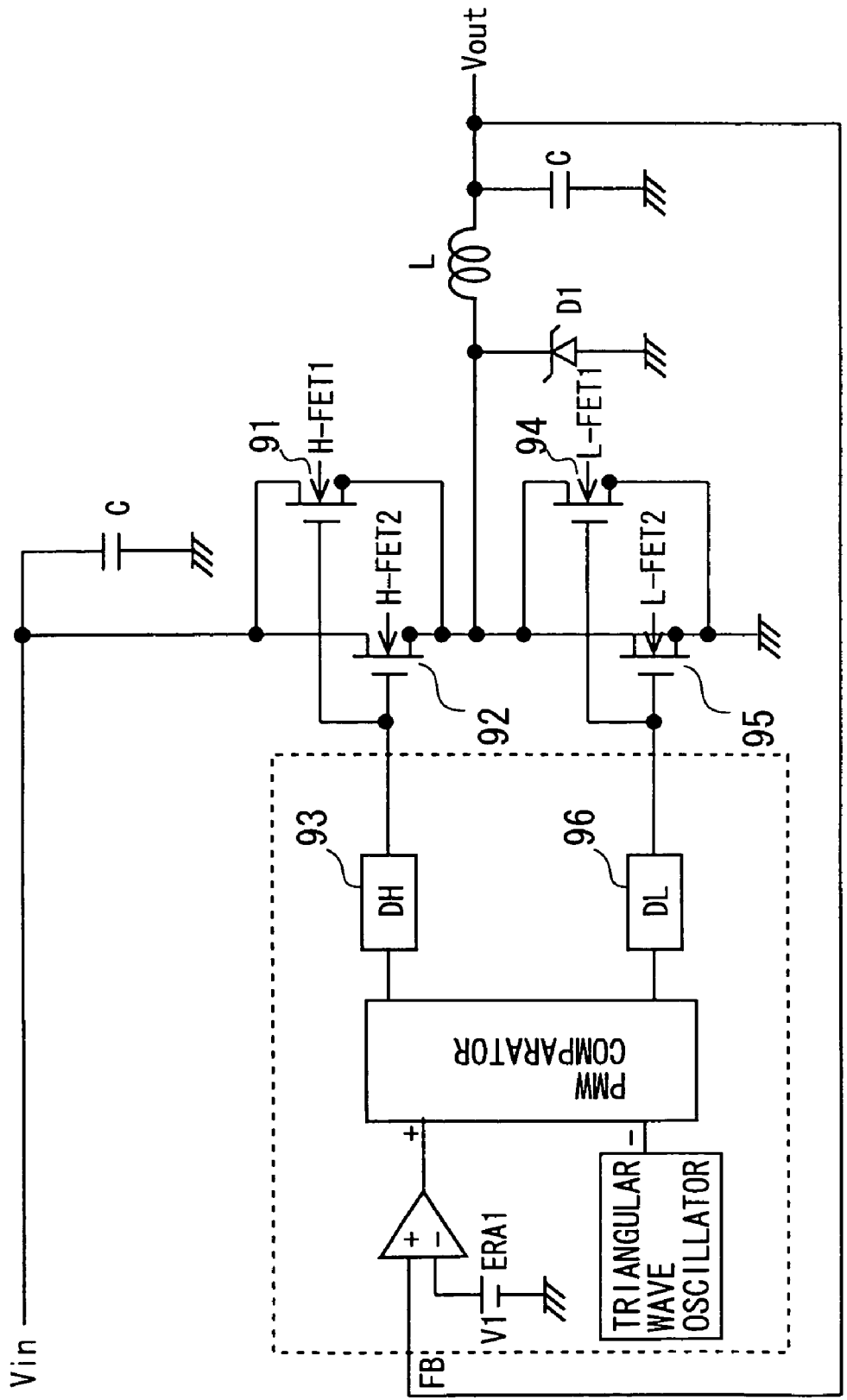
FIG. 14 is a diagram of an outline of the DC-DC converter in the related background art.

For instance, when the input voltage is 16V, the output voltage is 3.3V and the load current is 10 mA, in the circuit in FIG. 13, the inductance of the coil L3 can not be set large if the high-load time is taken into consideration, so that L3=2.5 µH, and, when setting ON-time per operation to 1 µsec, the oscillation frequency comes to 832 Hz. FIG. 7 shows an output voltage and an oscillation waveform in this state.

Figure 8:
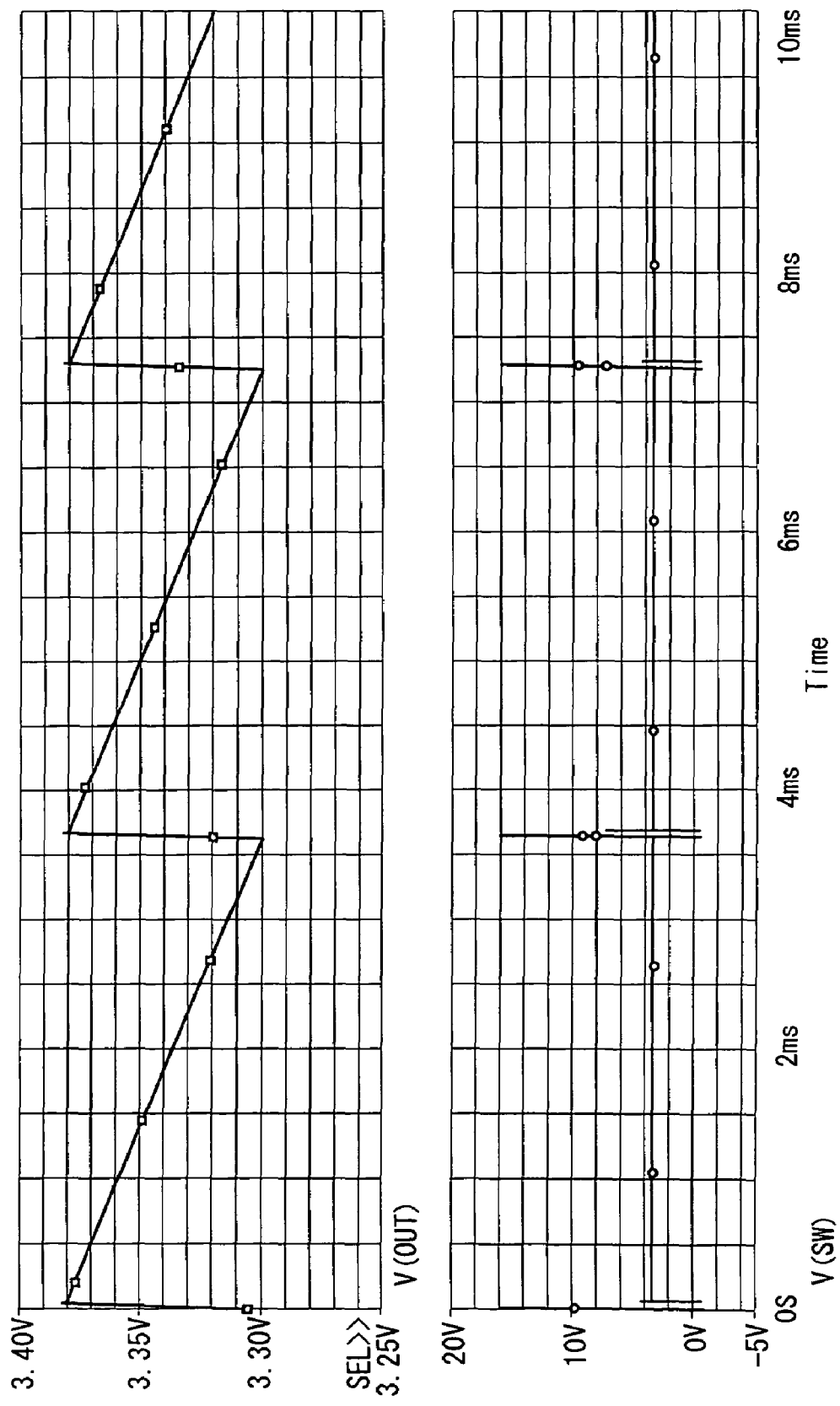
FIG. 8 is a diagram showing an output voltage and an oscillation waveform in a DC-DC converter in the third embodiment.

By contrast, in the circuit in the third embodiment, when setting such as the coil L1=2.5 µH and L2=97.5 µH, even if the coil L1 at the high-load time has the low inductance (2.5 µH), a total inductance of the coils L1 and L2 can be set as high as 100 µH at the low-load time, and therefore, in the case of adjusting to the same output voltage ripple (deflection width) as in FIG. 7, it is possible to set the ON-time per operation to 11 µsec and the oscillation frequency to 275 Hz as in FIG. 8.

Thus, according to the third embodiment, the oscillation frequency can be delayed and the high efficiency can be actualized while maintaining the output voltage ripple.

MODIFIED EXAMPLE 1

Figure 9:
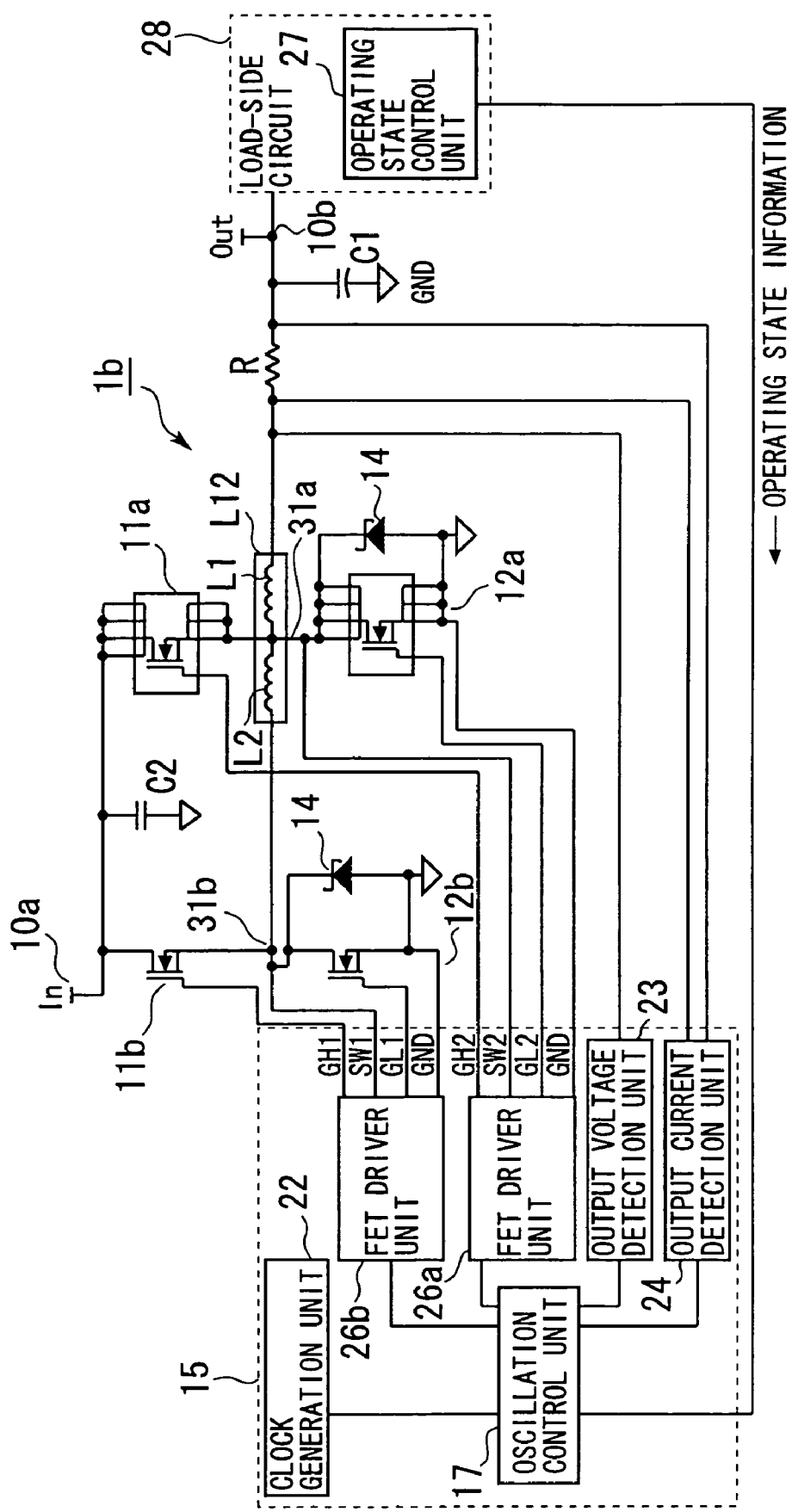
FIG. 9 is a diagram of an outline in a first modified example.

FIG. 9 is a circuit diagram in a modified example 1 of the third embodiment. This modified example is different in terms of using a single coil L12 in place of the coils L1, L2. Note that other configurations are the same.

As shown in FIG. 9, in this modified example, one terminal of the coil L12 is connected to an oscillation part 31*b* of the coil L12, the other terminal is connected to the output terminal 10*b*, and a middle point is connected to an oscillation part 31*a*.

Namely, the coil L12 in this modified example includes the coil L1 extending from an output-side terminal portion up to the middle point and the coil L2 extending from the middle point up to the output-side terminal portion.

With this arrangement, the packaging area can be made smaller than in the case of providing the coils L1 and L2 separately, thereby enabling the device to be downsized.

MODIFIED EXAMPLE 2

Figure 10:
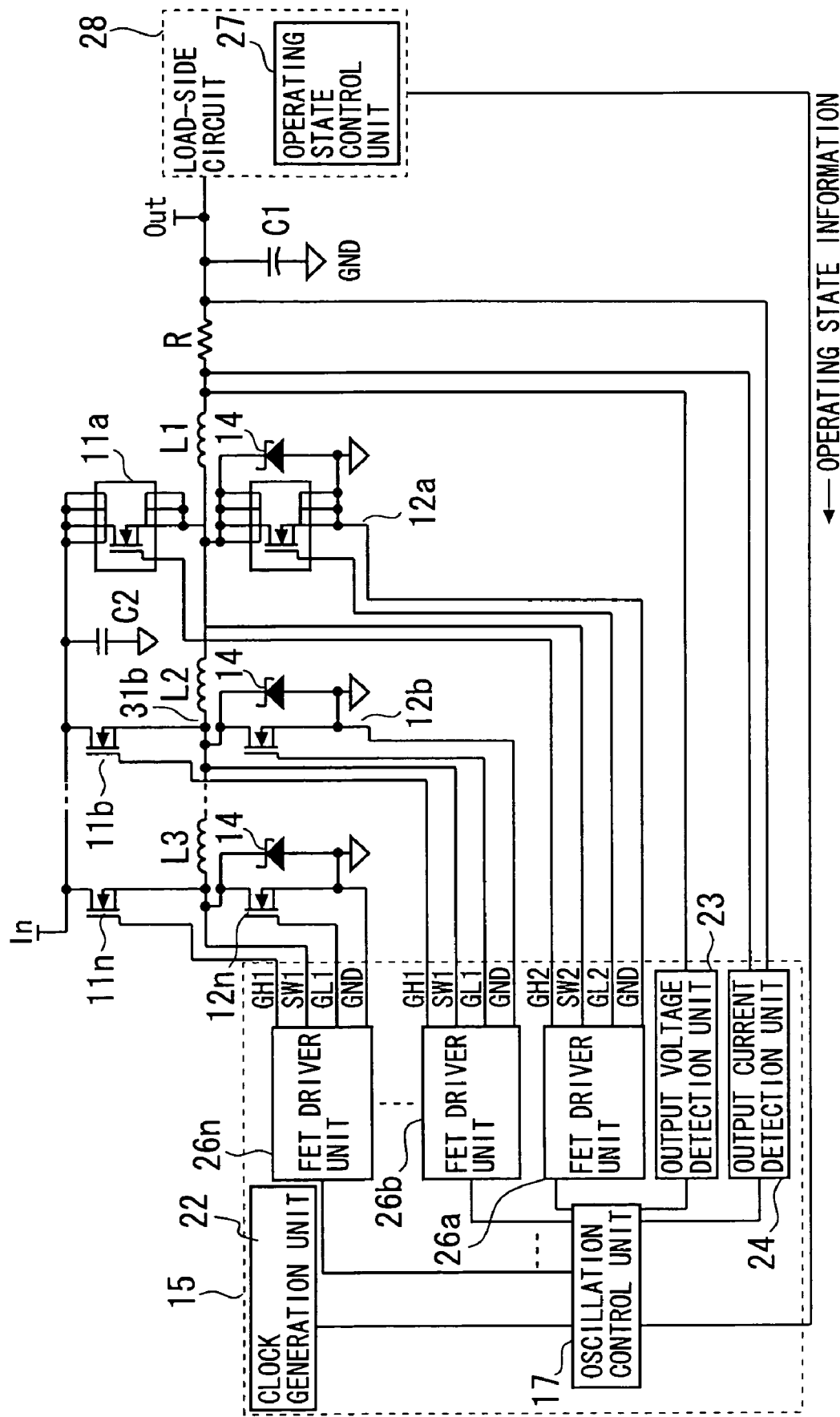
FIG. 10 is a diagram of an outline in a second modified example.

FIG. 10 is a circuit diagram in a modified example 2 of the third embodiment. The third embodiment has exemplified the example of including the two tuples of output control switches and of the synchronous rectification switches, however, the configuration is not limited to this example, and the output control switches and the synchronous rectification switches may also be provided.

For instance, as shown in FIG. 10, the FET 11*b*, FET 12*b* are set as the first A-switch and the second A-switch, while an n-th tuple of FETs 11*n*, 12*n* may be connected as the first B-switch and the second B-switch.

In this case, the minimum capacitance is given to the FETs 11*n*, 12*n* and to a coil Ln. Moreover, the coil Ln may have the minimum inductance.

Then, the oscillation control unit 17 selectively drives any one of the FET drivers 26a, 26b, 26n, corresponding to the load (the output current and operating state information).

Fourth Embodiment

Figure 11:
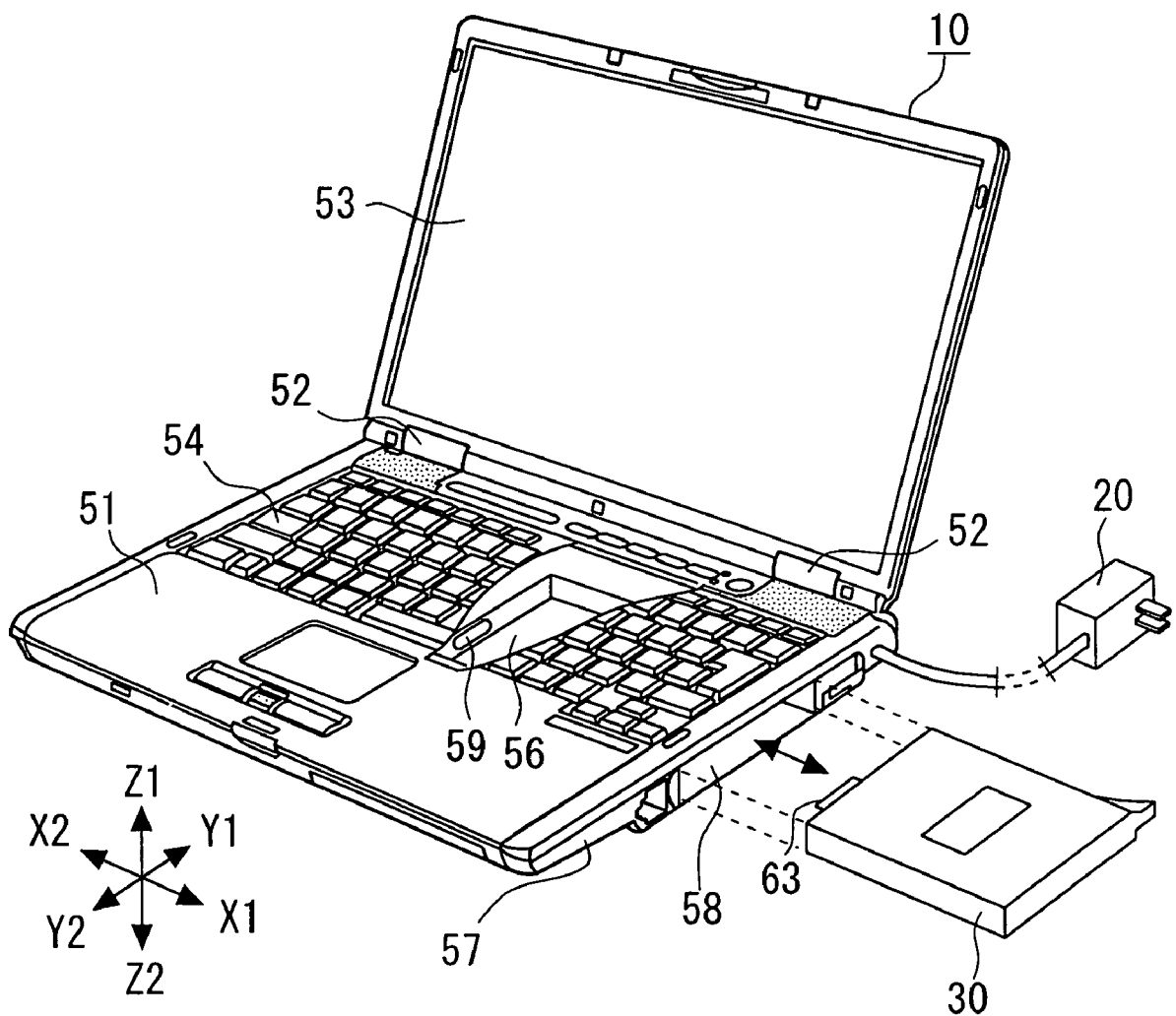
FIG. 11 is a perspective view of an external configuration of a notebook PC as an electronic device of the invention.
Figure 12:
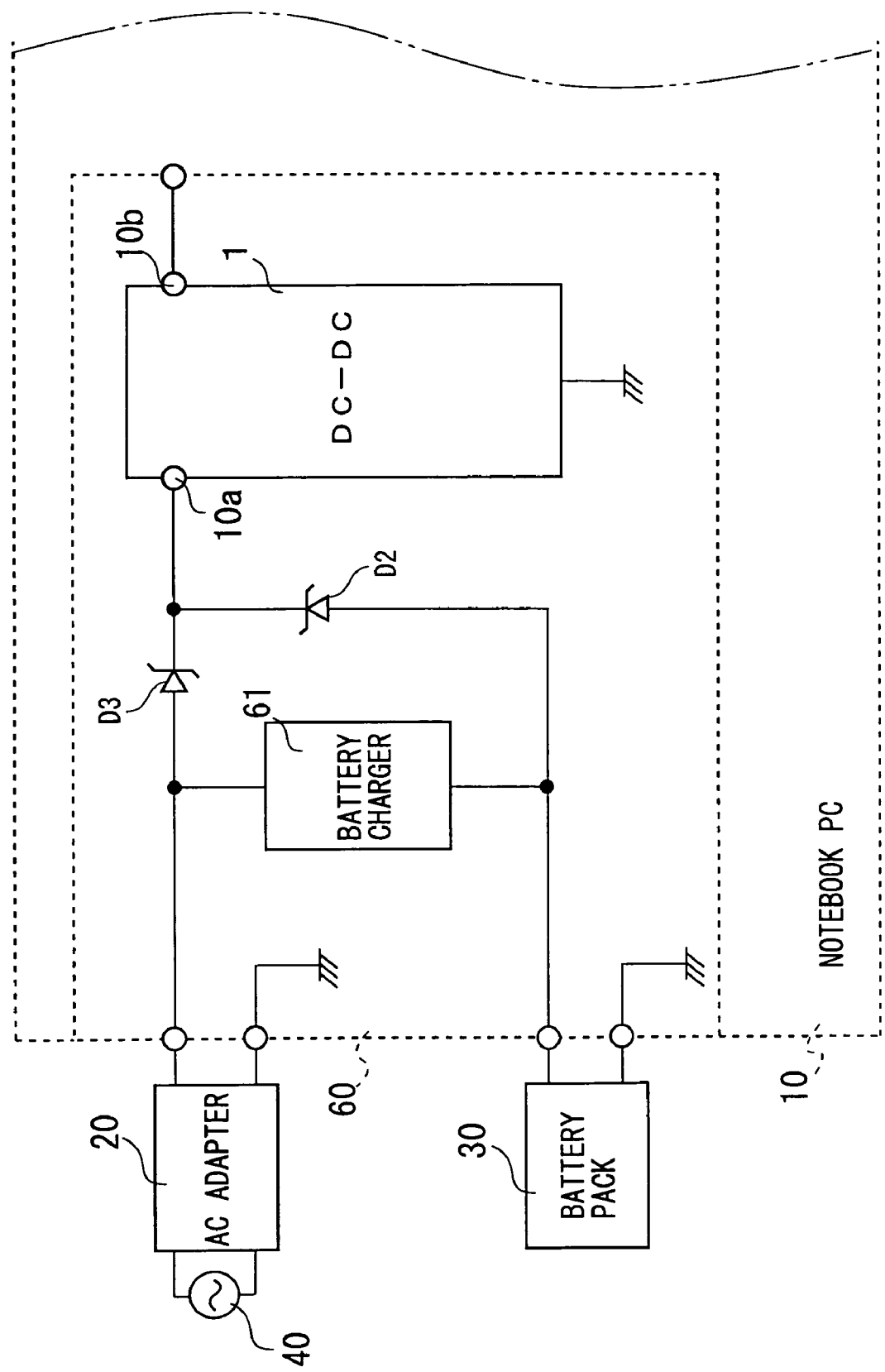
FIG. 12 is an explanatory diagram of a periphery to a power source unit of the electronic device.

FIG. 11 is a perspective view of an external configuration of a notebook type personal computer (which corresponds to an electronic device and will hereinafter be also called a notebook PC) as an electronic device of the invention. FIG. 12 is an explanatory diagram showing a periphery to a power source unit of the notebook PC. The third embodiment exemplifies an example of a notebook PC 10 including the power source unit provided with the same DC-DC converter 1 as the first embodiment has. Note that the same components as those in the first embodiment are marked with the same numerals and symbols, and the repetitive explanations are omitted.

In FIG. 11, the notebook PC 10 is constructed of a computer body 51 and a display unit 53 so connected to the computer body 51 as to be openable and closable through hinges 52. Arrowheads X1, X2 indicate a widthwise direction of the notebook PC 10, arrowheads Y1, Y2 indicate a depthwise direction, and arrowheads Z1, Z2 indicate a heightwise (thicknesswise) direction. The computer body 51 having a keyboard unit 54 on a top face includes a CPU etc. inside, and an accommodation unit 56 for the battery pack 30 is formed on the right side of a lower portion thereof. The accommodation unit 56 has an aperture 58 serving as an insert port of the battery pack 30 is formed in a right-side surface 57 of the computer body 51. The accommodation unit 56 is formed in a slit-like shape extending from this aperture 58 to the vicinity of the middle of the device in the direction of the arrowhead X2, and a connector 59 is provided at an X2-side end portion. Note that the connector 59 is disposed inwardly of the computer body 51, and hence the body 51 is illustrated in a way that cuts off part of the upper surface thereof in FIG. 11.

The battery pack 30 has a connector 63 taking a flat shape fittable in the accommodation unit 56 and fitted to the connector 59 at a front end portion in the insert direction (X2). The battery pack 30 is electrically connected to the power source unit 60 via these connectors 59, 63 when fitted in the accommodation unit 56.

Further, the notebook PC 10, to which an AC adapter 20 is connected, is supplied with DC power into which the AC adapter 20 converts commercial AC power.

The AC adapter 20 has a function of converting the electric power of a commercial power source 40 into the DC power of, e.g., 16 V, and supplying the DC power to the power source unit 60 of the notebook PC 10. The power supplied to this power source unit 60 is transferred to an input terminal 10a of the DC-DC converter via a diode D3, and the DC-DC converter 1 converts this power into power having a voltage employed in circuits (load) of the respective units within the notebook PC 10. Note that FIG. 12 illustrates only one output terminal 10b from the DC-DC converter 1, however, the output terminal is not limited to one. For instance, a configuration is that the output terminals may be provided for a plurality of lines, and voltages different from each other may be outputted therefrom.

Moreover, the power from the AC adapter 20 is supplied also to the battery pack 30 via a batter charger 61. The battery pack 30 accommodates an unillustrated secondary battery, and the battery charger 61 charges the secondary battery in the batter pack 30 with the electric power given from the AC adapter 20. Then, in the notebook PC 10, even in a state where the AC adapter 20 is removed, the power (that is on the order of, e.g., 12.6 V) from the batter pack 30 is transferred via the diode D2, further converted into the power having a predetermined voltage by the DC-DC converter 1 and thus supplied to the circuits (load) of the respective units.

This DC-DC converter 1, which is the same as in the first embodiment discussed above, stops or drives the driver circuit prepared for every FET corresponding to a state of the I/O voltage difference, thereby enabling the optimum drive control.

Hence, according to the third embodiment, the power consumption efficiency of the notebook PC (the electronic device) can be improved.

Note that the DC-DC converter 1 in the third embodiment may be replaced with the same DC-DC converter 1a as in the second embodiment discussed above. Moreover, the third embodiment adopts the configuration that the selector 17 stops part of the drivers in accordance with the I/O voltage difference and may, without being limited to this configuration, take such a configuration that the selector 17 stops part of the drivers in accordance with the input voltage or the output voltage.

For example, if the output voltage takes substantially a fixed value, the minimum number of the FETs required can be determined in the same way as described above from the difference between the output voltage assumed to be this value and the input voltage, and therefore, with the output voltage detection unit (differential amplifier) 23 omitted, the selector 17 may stop the drivers of which the number corresponds to the input voltage of the input voltage detection unit (difference amplifier) 22.

Moreover, for instance, if the input voltage takes substantially a fixed value, the minimum number of the FETs required can be determined in the same way as described above from the difference between the input voltage assumed to be this value and the output voltage, and therefore, with the input voltage detection unit (differential amplifier) 22 omitted, the selector 17 may stop the drivers of which the number corresponds to the output voltage of the output voltage detection unit (difference amplifier) 23.

Further, the DC-DC converter 1 in the fourth embodiment may replace the same DC-DC converter 1b as in the third embodiment discussed above, and the oscillation control unit 17 may be constructed to drive any one of the FET drivers 26a, 26b in accordance with the output current and load operating state information.

<Others>

The invention is not limited to only the illustrated examples given above and can be, as a matter of course, changed in a variety of forms in the range that does not deviate from the gist of the invention.

For example, even the configurations given in the following Notes can acquired the same effects as those in the embodiments discussed above. Further, the components thereof can be combined to the greatest possible degree.

(Note 1) A control circuit of a switching converter converting an input electric power to an output electric power by setting a plurality of first switches and the second switch alternately to an ON-state, comprising: a plurality of first driving units driving respectively the plurality of first switches; a second driving unit driving the second switch; and a selection unit stopping part of the plurality of first driving units in accordance with a load current.

(Note 2) A control circuit of a switching converter converting an input electric power to an output electric power by setting the first switch and a plurality of second switches alternately to an ON-state, comprising: a first driving unit driving the first switch; a plurality of second driving units driving respectively the plurality of second switches; and a selection unit stopping part or all of the plurality of second driving units in accordance with a load current.

(Note 3) A control circuit of a switching converter converting an input electric power to an output electric power by setting a plurality of first switches and plurality of second switches alternately to an ON-state, comprising: a plurality of first driving units driving respectively the plurality of first switches; a second driving unit driving the second switch; and a selection unit stopping part of the plurality of first driving units in accordance with an input voltage.

(Note 4) A control circuit of a switching converter converting an input electric power to an output electric power by setting a first switch and a plurality of second switches alternately to an ON-state, comprising: a first driving unit driving the first switch; a plurality of second driving units driving respectively the plurality of second switches; and a selection unit stopping part or all of the plurality of second driving units in accordance with an input voltage.

(Note 5) A control circuit of a switching converter converting an input electric power to an output electric power by setting a plurality of first switches and a second switch alternately to an ON-state, comprising: a plurality of first driving units driving respectively the plurality of first switches; a second driving unit driving the second switch; and a selection unit stopping part of the plurality of first driving units in accordance with an output voltage.

(Note 6) A control circuit of a switching converter converting an input electric power to an output electric power by setting a first switch and a plurality of second switches alternately to an ON-state, comprising: a first driving unit driving the first switch; a plurality of second driving units driving respectively the plurality of second switches; and a selection unit stopping part or all of the plurality of second driving units in accordance with an output voltage.

(Note 7) A control circuit of a switching converter converting an input electric power to an output electric power by setting a plurality of first switches and a second switch alternately to an ON-state, comprising: a plurality of first driving units driving respectively the plurality of first switches; a second driving unit driving the second switch; and a selection unit stopping part of the plurality of first driving units in accordance with an input/output voltage difference.

(Note 8) A control circuit of a switching converter converting an input electric power to an output electric power by setting a first switch and a plurality of second switches alternately to an ON-state, comprising: a first driving unit driving the first switch; a plurality of second driving units driving respectively the plurality of second switches; and a selection unit stopping part or all of the plurality of second driving units in accordance with an input/output voltage difference.

(Note 9) A control circuit of a switching converter converting an input electric power to an output electric power by setting a plurality of first switch and a plurality of second switch alternately to an ON-state, comprising: a plurality of first driving units driving respectively the plurality of first switches; a plurality of second driving units driving respectively the plurality of second switches; and a selection unit stopping part of the plurality of first driving units, and part or all of the plurality of second driving units in accordance with a load current.

(Note 10) A control circuit of a switching converter converting an input electric power to an output electric power by setting a plurality of first switches and a plurality of second switch alternately to an ON-state, comprising: a plurality of first driving units driving respectively the plurality of first switches; a plurality of second driving units driving respectively the plurality of second switches; and a selection unit stopping part of the plurality of first driving units, and part or all of the plurality of second driving units in accordance with an input voltage.

(Note 11) A control circuit of a switching converter converting an input electric power to an output electric power by setting a plurality of first switches and a plurality of second switches alternately to an ON-state, comprising: a plurality of first driving units driving respectively the plurality of first switches; a plurality of second driving units driving respectively the plurality of second switches; and a selection unit stopping part of the plurality of first driving units, and part or all of the plurality of second driving units in accordance with an output voltage.

(Note 12) A control circuit of a switching converter converting an input electric power to an output electric power by setting a plurality of first switch and a plurality of second switch alternately to an ON-state, comprising: a plurality of first driving units driving respectively the plurality of first switches; a plurality of second driving units driving respectively the plurality of second switches; and a selection unit stopping part of the plurality of first driving units, and part or all of the plurality of second driving units in accordance with an input/output voltage difference.

(Note 13)
A switching converter comprising:
a plurality of first switches;
a second switch;
a plurality of first driving units driving respectively the plurality of first switches;
a second driving unit driving the second switch;
a load current detection unit detecting a load current; and
a selection unit stopping part of the plurality of first driving units in accordance with the load current detected by the load current detection unit.

(Note 14)
A switching converter comprising:
a first switch;
a plurality of second switches;
a first driving unit driving the first switch;
a plurality of second driving units driving respectively the plurality of second switches;
a load current detection unit detecting a load current; and
a selection unit stopping part or all of the plurality of second driving units in accordance with the load current detected by the load current detection unit.

(Note 15)
A switching converter comprising:
a plurality of first switches;
a second switch;
a plurality of first driving units driving respectively the plurality of first switches;
a second driving unit driving the second switch;
an input voltage detection unit detecting an input voltage; and
a selection unit stopping part of the plurality of first driving units in accordance with the input voltage detected by the input voltage detection unit.

(Note 16)
A switching converter comprising:
a first switch;
a plurality of second switches;
a first driving unit driving the first switch;
a plurality of second driving units driving respectively the plurality of second switches;
an input voltage detection unit detecting an input voltage; and a selection unit stopping part or all of the plurality of second driving units in accordance with the input voltage detected by the input voltage detection unit.

(Note 17)
A switching converter comprising:
a plurality of first switches;
a second switch;
a plurality of first driving units driving respectively the plurality of first switches;
a second driving unit driving the second switch;
an output voltage detection unit detecting an output voltage; and
a selection unit stopping part of the plurality of first driving units in accordance with the output voltage detected by the output voltage detection unit.

(Note 18)
A switching converter comprising:
a first switch;
a plurality of second switches;
a first driving unit driving the first switch;
a plurality of second driving units driving respectively the plurality of second switches;
an output voltage detection unit detecting an output voltage; and
a selection unit stopping part or all of the plurality of second driving units in accordance with the output voltage detected by the output voltage detection unit.

(Note 19)
A switching converter comprising:
a plurality of first switches;
a second switch;
a plurality of first driving units driving respectively the plurality of first switches;
a second driving unit driving the second switch;
a voltage difference detection unit detecting an input/output voltage difference; and
a selection unit stopping part of the plurality of first driving units in accordance with the input/output voltage difference detected by the voltage difference detection unit.

(Note 20)
A switching converter comprising:
a first switch;
a plurality of second switches;
a first driving unit driving the first switch;
a plurality of second driving units driving respectively the plurality of second switches;
a voltage difference detection unit detecting an input/output voltage difference; and
a selection unit stopping part or all of the plurality of second driving units in accordance with the input/output voltage difference detected by the voltage difference detection unit.

(Note 21)
A switching converter comprising:
a plurality of first switches;
a plurality of second switches;
a plurality of first driving units driving respectively the plurality of first switches;
a plurality of second driving units driving respectively the plurality of second switches;
a load current detection unit detecting a load current; and
a selection unit stopping part of the plurality of first driving units and stopping part or all of the plurality of second driving units in accordance with the load current detected by the load current detection unit.

(Note 22)
A switching converter comprising:
a plurality of first switches;
a plurality of second switches;
a plurality of first driving units driving respectively the plurality of first switches;
a plurality of second driving units driving respectively the plurality of second switches;
an input voltage detection unit detecting an input voltage; and
a selection unit stopping part of the plurality of first driving units and stopping part or all of the plurality of second driving units in accordance with the input voltage detected by the input voltage detection unit.

(Note 23)
A switching converter comprising:
a plurality of first switches;
a plurality of second switches;
a plurality of first driving units driving respectively the plurality of first switches;
a plurality of second driving units driving respectively the plurality of second switches;
an output voltage detection unit detecting an output voltage; and
a selection unit stopping part of the plurality of first driving units and stopping part or all of the plurality of second driving units in accordance with the output voltage detected by the output voltage detection unit.

(Note 24)
A switching converter comprising:
a plurality of first switches;
a plurality of second switches;
a plurality of first driving units driving respectively the plurality of first switches;
a plurality of second driving units driving respectively the plurality of second switches;
a voltage difference detection unit detecting an input/output voltage difference; and
a selection unit stopping part of the plurality of first driving units and stopping part or all of the plurality of second driving units in accordance with the input/output voltage difference detected by the voltage difference detection unit.

(Note 25)
An electronic device including a switching converter and a load operated by an output from the switching converter, the switching converter comprising:
a plurality of first switches;
a second switch;
a plurality of first driving units driving respectively the plurality of first switches;
a second driving unit driving the second switch;
a load current detection unit detecting a load current; and
a selection unit stopping part of the plurality of first driving units in accordance with the load current detected by the load current detection unit.

(Note 26)
An electronic device including a switching converter and a load operated by an output from the switching converter, the switching converter comprising:
a first switch;
a plurality of second switches;
a first driving unit driving the first switch;
a plurality of second driving units driving respectively the plurality of second switches;

a load current detection unit detecting a load current; and
a selection unit stopping part or all of the plurality of second driving units in accordance with the load current detected by the load current detection unit.

(Note 27)

An electronic device including a switching converter and a load operated by an output from the switching converter, the switching converter comprising:
a plurality of first switches;
a second switch;
a plurality of first driving units driving respectively the plurality of first switches;
a second driving unit driving the second switch;
an input voltage detection unit detecting an input voltage; and
a selection unit stopping part of the plurality of first driving units in accordance with the input voltage detected by the input voltage detection unit.

(Note 28)

An electronic device including a switching converter and a load operated by an output from the switching converter, the switching converter comprising:
a first switch;
a plurality of second switches;
a first driving unit driving the first switch;
a plurality of second driving units driving respectively the plurality of second switches;
an input voltage detection unit detecting an input voltage; and
a selection unit stopping part or all of the plurality of second driving units in accordance with the input voltage detected by the input voltage detection unit.

(Note 29)

An electronic device including a switching converter and a load operated by an output from the switching converter, the switching converter comprising:
a plurality of first switches;
a second switch;
a plurality of first driving units driving respectively the plurality of first switches;
a second driving unit driving the second switch;
an output voltage detection unit detecting an output voltage; and
a selection unit stopping part of the plurality of first driving units in accordance with the output voltage detected by the output voltage detection unit.

(Note 30)

An electronic device including a switching converter and a load operated by an output from the switching converter, the switching converter comprising:
a first switch;
a plurality of second switches;
a first driving unit driving the first switch;
a plurality of second driving units driving respectively the plurality of second switches;
an output voltage detection unit detecting an output voltage; and
a selection unit stopping part or all of the plurality of second driving units in accordance with the output voltage detected by the output voltage detection unit.

(Note 31)

An electronic device including a switching converter and a load operated by an output from the switching converter, the switching converter comprising:
a plurality of first switches;
a second switch;
a plurality of first driving units driving respectively the plurality of first switches;
a second driving unit driving the second switch;
a voltage difference detection unit detecting an input/output voltage difference; and
a selection unit stopping part of the plurality of first driving units in accordance with the input/output voltage difference detected by the voltage difference detection unit.

(Note 32)

An electronic device including a switching converter and a load operated by an output from the switching converter, the switching converter comprising:
a first switch;
a plurality of second switches;
a first driving unit driving the first switch;
a plurality of second driving units driving respectively the plurality of second switches;
a voltage difference detection unit detecting an input/output voltage difference; and
a selection unit stopping part or all of the plurality of second driving units in accordance with the input/output voltage difference detected by the voltage difference detection unit.

(Note 33)

An electronic device including a switching converter and a load operated by an output from the switching converter, the switching converter comprising:
a plurality of first switches;
a plurality of second switches;
a plurality of first driving units driving respectively the plurality of first switches;
a plurality of second driving units driving respectively the plurality of second switches;
a load current detection unit detecting a load current; and
a selection unit stopping part of the plurality of first driving units and stopping part or all of the plurality of second driving units in accordance with the load current detected by the load current detection unit.

(Note 34)

An electronic device including a switching converter and a load operated by an output from the switching converter, the switching converter comprising:
a plurality of first switches;
a plurality of second switches;
a plurality of first driving units driving respectively the plurality of first switches;
a plurality of second driving units driving respectively the plurality of second switches;
an input voltage detection unit detecting an input voltage; and
a selection unit stopping part of the plurality of first driving units and stopping part or all of the plurality of second driving units in accordance with the input voltage detected by the input voltage detection unit.

(Note 35)

An electronic device including a switching converter and a load operated by an output from the switching converter, the switching converter comprising:
a plurality of first switches;
a plurality of second switches;
a plurality of first driving units driving respectively the plurality of first switches;
a plurality of second driving units driving respectively the plurality of second switches;
an output voltage detection unit detecting an output voltage; and a selection unit stopping part of the plurality of first driving units and stopping part or all of the plurality of second driving units in accordance with the output voltage detected by the output voltage detection unit.

(Note 36)

An electronic device including a switching converter and a load operated by an output from the switching converter, the switching converter comprising:

a plurality of first switches;

a plurality of second switches;

a plurality of first driving units driving respectively the plurality of first switches;

a plurality of second driving units driving respectively the plurality of second switches;

a voltage difference detection unit detecting an input/output voltage difference; and a selection unit stopping part of the plurality of first driving units and stopping part or all of the plurality of second driving units in accordance with the input/output voltage difference detected by the voltage difference detection unit.

A switching circuit includes: an A-coil connected to an output terminal; a first A-switch switching electric power outputted via the A-coil; a second A-switch making rectification so as to become an ON-state alternately with the first A-switch; an A-driving unit driving the first A-switch and the second A-switch alternately; a B-coil connected in series to the A-coil; and a first B-switch switching the electric power outputted via the B-coil and the A-coil. (10)

(Note 38) A switching converter includes: an A-coil connected to an output terminal; a first A-switch switching electric power outputted via the A-coil; a second A-switch making rectification so as to become an ON-state alternately with the first A-switch; an A-driving unit driving the first A-switch and the second B-switch alternately; a B-coil connected in series to the A-coil; a first B-switch switching the electric power outputted via the B-coil and the A-coil; a second B-switch making the rectification so as to become an ON-state alternately with the first B-switch; an A-driving unit driving the first B-switch and the second B-switch alternately; and a selection unit causing the A-driving unit and the B-driving unit to drive selectively. (11)

(Note 39)

A switching converter according to Note 38, wherein the first A-switch and the second A-switch is set to have a larger capacity than the first B-switch and the second B-switch have, and the selection unit drives the A-driving unit when an output load is higher than a predetermined value and drives the B-driving unit when the output load is equal to or lower than the predetermined value. (12)

(Note 40)

A switching converter according to Note 38 or 39, wherein the A-coil may be set to have a larger capacity than the B-coil, and the selection unit drives the A-driving unit when the output load is higher than a predetermined value and drives the B-driving unit when the output load is equal to or lower than the predetermined value. (13)

(Note 41)

A switching converter according to Note 40, wherein the A-coil has a lower inductance than the B-coil. (14)

(Note 42)

A switching converter according to any one of Notes 38 through 41, wherein the A-driving unit is set to have a larger capacity than the B-driving unit, and the selection unit drives the A-driving unit when the output load is higher than a predetermined value and drives the B-driving unit when the output load is equal to or lower than the predetermined value. (15)

(Note 43)

A switching converter according to any one of Notes 38 through 42, wherein the A-coil extends from one terminal of the single coil up to a middle point thereof, and the B-coil extends from the middle point up to the other terminal thereof. (16)

(Note 44)

A switching converter according to any one of Notes 38 through 43, wherein the selection unit receives information representing an operating state of a load-sided circuit, and drives the A-driving unit or the B-driving unit in accordance with the information. (17)

(Note 45)

A switching converter according to any one of Notes 38 through 44, wherein the selection unit drives the A-driving unit or the B-driving unit in accordance with an output current. (18)

(Note 46)

A switching converter includes:

a first A-FET having a drain terminal that is connected to an input terminal;

a second A-FET having a drain terminal that is connected to a source terminal of the first A-FET, and a source terminal that is connected to the ground;

an A-driving unit connected to gate terminals of the first A-FET and of the second A-FET, and driving the first A-FET and the second A-FET alternately;

an A-coil having one terminal that is connected to an A-oscillation part to which the source terminal of the first A-FET and the drain terminal of the second A-FET are connected, and having the other terminal that is connected to an output terminal;

a first B-FET having a drain terminal that is connected to an input terminal;

a second B-FET having a drain terminal that is connected to the source terminal of the first B-FET and a source terminal that is connected to the ground;

a B-driving unit connected to gate terminals of the first B-FET and of the second B-FET, and driving the first B-FET and the second B-FET alternately;

a B-coil having one terminal that is connected to an B-oscillation part to which the source terminal of the first B-FET and the drain terminal of the second B-FET are connected, and having the other terminal that is connected to A-oscillation part; and a selection unit selectively driving the A-driving unit and the B-driving unit. (19)

(Note 47) An electronic device having a switching converter and a load operating by an output from the switching converter, the switching converter including: an A-coil connected to an output terminal; a first A-switch switching electric power outputted via the A-coil; a second A-switch making rectification so as to become an ON-state alternately with the first A-switch; an A-driving unit driving the first A-switch and the second B-switch alternately; a B-coil connected in series to the A-coil; a first B-switch switching the electric power outputted via the B-coil and the A-coil; a second B-switch making the rectification so as to become an ON-state alternately with the first B-switch; an A-driving unit driving the first B-switch and the second B-switch alternately; and a selection unit causing the A-driving unit and the B-driving unit to drive selectively. (20)

INDUSTRIAL APPLICABILITY

The invention can be applied to all types of electronic devices such as computers, cellular phones, video cameras, network devices, audio devices, etc. that utilize the DC power.

INCORPORATION BY REFERENCE

The disclosures of Japanese patent application No. JP2005-080640 filed on Mar. 18, 2005, No. JP 2006-051018 filed on Feb. 27, 2006 and U.S. patent application No. 11/239,364 filed on Sep. 30, 2005 including the specification, drawings and abstract are incorporated herein by reference.

What is claimed is:

1. A control circuit of a switching converter for converting an input electric power to an output electric power by setting a first switch and a plurality of second switches alternately to an ON-state, the control circuit including:
   a first driving unit driving the first switch;
   a plurality of second driving units for respectively driving the plurality of second switches; and
   a selection unit receiving a load current value and pulse width modulated signals from a comparator and stopping part or the whole of the plurality of second driving units based on said load current value.

2. A control circuit of a switching converter for converting an input electric power to an output electric power by setting a plurality of first switches and a plurality of second switches alternately to an ON-state, comprising:
   a plurality of first driving units driving respectively the plurality of first switches;
   a plurality of second driving units driving respectively the plurality of second switches; and
   a selection unit receiving a load current value and pulse width modulated signals from a comparator and stopping part of the plurality of first driving units, and part or all of the plurality of second driving units based on said load current value.

3. A switching converter including:
   a first switch;
   a plurality of second switches;
   a first driving unit driving the first switch;
   a plurality of second driving units driving each of the plurality of second switches;
   a detection unit detecting a load current value; and
   a selection unit receiving said load current value and pulse width modulated signals from a comparator and stopping part or all of the plurality of second driving units based on said load current value.

4. A switching converter including:
   a plurality of first switches;
   a plurality of second switches;
   a plurality of first driving units driving each of the plurality of first switches;
   a plurality of second driving units driving each of the plurality of second switches;
   a detection unit detecting a load current value; and
   a selection unit receiving said load current value and pulse width modulated signals from a comparator and stopping part of the plurality of first driving units and part or all of the plurality of second driving units based on said load current value.

5. An electronic device including a switching converter and a load operated by an output from the switching converter, the switching converter comprising:
   a first switch;
   a plurality of second switches;
   a first driving unit driving the first switch;
   a plurality of second driving units driving respectively the plurality of second switches;
   a detection unit detecting a load current value; and
   a selection unit receiving said load current value and pulse width modulated signals from a comparator and stopping part or all of the plurality of second driving units based on a result of the detection of said load current value by the detection unit.

6. An electronic device including a switching converter and a load operated by an output from the switching converter, the switching converter comprising:
   a plurality of first switches;
   a plurality of second switches;
   a plurality of first driving units driving respectively the plurality of first switches;
   a plurality of second driving units driving respectively the plurality of second switches;
   a detection unit detecting a load current value; and
   a selection unit receiving said load current value and pulse width modulated signals from a comparator and stopping part of the plurality of first driving units and part or all of the plurality of second driving units based on said load current value.

7. A switching circuit comprising:
   an A-coil connected to an output terminal;
   a first A-switch switching electric power outputted via the A-coil;
   a second A-switch rectifying the electric power to become direct current thereby the second A-switch becomes set to an ON-state alternately with the first A-switch;
   an A-driving unit driving the first A-switch and the second A-switch alternately;
   a B-coil connected in series to the A-coil;
   a first B-switch switching the electric power outputted via the B-coil and the A-coil; and
   a second B-switch rectifying the electric power to become direct current thereby the second B-switch becomes set to an ON-state alternately with the first B-switch, and
   wherein the first A-switch and the second A-switch is set to have a larger capacity than the first B-switch and the second B-switch have, and
   the selection unit drives the A-driving unit when an output load is higher than a predetermined value and drives the B-driving unit when the output load is equal to or lower than the predetermined value.

8. A switching converter, comprising:
   an A-coil connected to an output terminal;
   a first A-switch switching electric power outputted via the A-coil;
   a second A-switch rectifying the electric power to become direct current thereby the second A-switch becomes set to an ON-state alternately with the first A-switch;
   an A-driving unit driving the first A-switch and the second A-switch alternately;
   a B-coil connected in series to the A-coil;
   a first B-switch switching the electric power outputted via the B-coil and the A-coil;
   a second B-switch rectifying the electric power to become direct current thereby the second B-switch becomes set to an ON-state alternately with the first B-switch;
   a B-driving unit driving the first B-switch and the second B-switch alternately; and
   a selection unit causing the A-driving unit and the B-driving unit to drive selectively, and wherein the first A-switch and the second A-switch is set to have a larger capacity than the first B-switch and the second B-switch have, and the selection unit drives the A-driving unit when an output load is higher than a predetermined value and drives the B-driving unit when the output load is equal to or lower than the predetermined value.

9. A switching converter according to claim 8, wherein the A-coil may be set to have a larger capacity than the B-coil, and the selection unit drives the A-driving unit when the output load is higher than a predetermined value and drives the B-driving unit when the output load is equal to or lower than the predetermined value.

10. A switching converter according to claim 9, wherein the A-coil has a lower inductance than the B-coil.

11. A switching converter according to claim 8, wherein the A-driving unit is set to have a larger capacity than the B-driving unit, and the selection unit drives the A-driving unit when the output load is higher than a predetermined value and drives the B-driving unit when the output load is equal to or lower than the predetermined value.

12. A switching converter according to claim 8, wherein the A-coil extends from one terminal to a middle point thereof, and the B-coil extends from the middle point up to the other terminal thereof.

13. A switching converter according to claim 8, wherein the selection unit receives information representing an operating state of a load-sided circuit, and drives the A-driving unit or the B-driving unit in accordance with the information.

14. A switching converter according to claim 8, wherein the selection unit drives the A-driving unit or the B-driving unit in accordance with an output current.

15. A switching converter includes:

a first A-FET having a drain terminal that is connected to an input terminal;

a second A-FET having a drain terminal that is connected to a source terminal of the first A-FET, and a source terminal that is connected to the ground;

an A-driving unit connected to gate terminals of the first A-FET and of the second A-FET, and driving the first A-FET and the second A-FET alternately;

an A-coil having one terminal that is connected to an A-oscillation part to which the source terminal of the first A-FET and the drain terminal of the second A-FET are connected, and having the other terminal that is connected to an output terminal;

a first B-FET having a drain terminal that is connected to an input terminal;

a second B-FET having a drain terminal that is connected to the source terminal of the first B-FET and a source terminal that is connected to the ground;

a B-driving unit connected to gate terminals of the first B-FET and of the second B-FET, and driving the first B-FET and the second B-FET alternately;

a B-coil having one terminal that is connected to an B-oscillation part to which the source terminal of the first B-FET and the drain terminal of the second B-FET are connected, and having the other terminal that is connected to A-oscillation part; and a selection unit selectively driving the A-driving unit and the B-driving unit, wherein the selection unit drives the A-driving unit when an output load is higher than a predetermined value and drives the B-driving unit when the output load is equal to or lower than the predetermined value.

16. An electronic device having a switching converter and a load operating by an output from the switching converter, the switching converter including:

an A-coil connected to an output terminal;

a first A-switch switching electric power outputted via the A-coil;

a second A-switch rectifying the electric power to become direct current thereby the second A-switch becomes set to an ON-state alternately with the first A-switch;

an A-driving unit driving the first A-switch and the second A-switch alternately;

a B-coil connected in series to the A-coil;

a first B-switch switching the electric power outputted via the B-coil and .the A-coil;

a second B-switch rectifying the electric power to become direct current thereby the second B-switch becomes set to an ON-state alternately with the first B-switch;

a B-driving unit driving the first B-switch and the second B-switch alternately; and a selection unit causing the A-driving unit and the B-driving unit to drive selectively, wherein the selection unit drives the A-driving unit when an output load is higher than a predetermined value and drives the B-driving unit when the output load is equal to or lower than the predetermined value.

* * * * *

UNITED STATES PATENT AND TRADEMARK OFFICE
CERTIFICATE OF CORRECTION

| | |
|---|---|
| PATENT NO. | : 7,492,135 B2 |
| APPLICATION NO. | : 11/377213 |
| DATED | : February 17, 2009 |
| INVENTOR(S) | : Mitsuo Saeki et al. |

It is certified that error appears in the above-identified patent and that said Letters Patent is hereby corrected as shown below:

Column 28, Line 33 Claim 16, change "and .the" to --and the--.

Signed and Sealed this

Thirtieth Day of June, 2009

JOHN DOLL
*Acting Director of the United States Patent and Trademark Office*